United States Patent
Kim et al.

(10) Patent No.: US 11,734,067 B2
(45) Date of Patent: Aug. 22, 2023

(54) MULTI-CORE SYSTEM AND CONTROLLING OPERATION OF THE SAME

(71) Applicant: Samsung Electronics Co., Ltd., Suwon-si (KR)

(72) Inventors: Jae Min Kim, Suwon-si (KR); Byungchul Jeon, Seongnam-si (KR); Junho Huh, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 542 days.

(21) Appl. No.: 16/789,602

(22) Filed: Feb. 13, 2020

(65) Prior Publication Data

US 2021/0042157 A1 Feb. 11, 2021

(30) Foreign Application Priority Data

Aug. 6, 2019 (KR) .................. 10-2019-0095720

(51) Int. Cl.
*G06F 9/48* (2006.01)
*G06F 9/50* (2006.01)
(Continued)

(52) U.S. Cl.
CPC .......... *G06F 9/4893* (2013.01); *G06F 1/3287* (2013.01); *G06F 9/505* (2013.01);
(Continued)

(58) Field of Classification Search
CPC ...... G06F 9/4893; G06F 1/3287; G06F 9/505; G06F 11/3024; G06F 11/3423; G06F 2209/486
See application file for complete search history.

(56) References Cited

U.S. PATENT DOCUMENTS 8,549,339 B2 * 10/2013 Wolfe ................. G06F 9/5094
713/320
8,892,931 B2 11/2014 Kruglick
(Continued)

FOREIGN PATENT DOCUMENTS

JP 6051924 B2 12/2016
KR 2014-0140943 A 12/2014
(Continued)

OTHER PUBLICATIONS

Jeon et al. Load Unbalancing Strategy for Multicore Embedded Processors. [online] (October). IEEE., pp. 1434-1440. Retrieved From the Internet <https://ieeexplore.ieee.org/stamp/stamp.jsp?arnumber=5374370&tag=1> (Year: 2010).*
(Continued)

*Primary Examiner* — Emerson C Puente
*Assistant Examiner* — Jonathan R Labud
(74) *Attorney, Agent, or Firm* — Harness, Dickey & Pierce, P.L.C.

(57) ABSTRACT

In a method of operating a multi-core system comprising a plurality of processor cores, a plurality of task stall information respectively corresponding to a plurality of tasks are provided by monitoring a task stall time with respect to each task. The task stall time indicates a time while the each task is suspended within a task active time, and the task active time indicates a time while a corresponding processor core is occupied by the each task. Task scheduling is performed based on the plurality of task stall information, and a fine-grained dynamic voltage and frequency scaling (DVFS) is performed based on the task scheduling. The plurality of tasks may be assigned to the plurality of processor cores based on load unbalancing, and the effects of the fine-grained DVFS may be increased to reduce the power consumption of the multi-core system.

19 Claims, 20 Drawing Sheets

(51) Int. Cl.
    *G06F 1/3287* (2019.01)
    *G06F 11/30* (2006.01)
    *G06F 11/34* (2006.01)

(52) U.S. Cl.
    CPC ...... *G06F 11/3024* (2013.01); *G06F 11/3423* (2013.01); *G06F 2209/486* (2013.01)

(56) References Cited

U.S. PATENT DOCUMENTS

| | | | |
|---|---|---|---|
| 9,405,349 B2 | 8/2016 | Seo et al. | |
| 9,529,407 B2 | 12/2016 | Murakami | |
| 9,746,902 B2 | 8/2017 | Min | |
| 10,101,800 B2 | 10/2018 | Ansorregui et al. | |
| 2008/0201591 A1* | 8/2008 | Hu | G06F 1/3203 713/323 |
| 2014/0337849 A1* | 11/2014 | Seo | G06F 9/46 718/102 |
| 2015/0100964 A1 | 4/2015 | Na et al. | |
| 2015/0186160 A1* | 7/2015 | Arora | G06F 11/3423 713/1 |
| 2017/0322616 A1 | 11/2017 | Hsiao et al. | |
| 2018/0181183 A1 | 6/2018 | Yoon et al. | |
| 2018/0321980 A1* | 11/2018 | Lo | G06F 9/4887 |
| 2018/0366466 A1 | 12/2018 | Zerbe et al. | |
| 2019/0087259 A1* | 3/2019 | Saxena | G06F 11/20 |

FOREIGN PATENT DOCUMENTS

| | | |
|---|---|---|
| KR | 1697647 | 4/2015 |
| KR | 2016-0006328 A | 1/2016 |
| KR | 2017-0015097 A | 2/2017 |
| KR | 2018-0076840 A | 7/2018 |
| WO | WO-11/073109 A1 | 6/2011 |

OTHER PUBLICATIONS

Choi et al. Fine-Grained Dynamic Voltage and Frequency Scaling for Precise Energy and Performance Tradeoff Based on the Ratio of Off-Chip Access to On-Chip Computation Times. [online] (January). IEEE., pp. 18-28. Retrieved From the Internet (Year: 2005).*
Kihwan Choi et al., "Fine-grained dynamic voltage and frequency scaling for precise energy and performance trade-off based on the ratio of off-chip access to on-chip computation times Fine-Grained DVFS Using On-Chip Regulators," IEEE Transactions on Computer-Aided Design of Integrated Circuits and Systems 24(1):18-28 • Feb. 2005, DOI: 10.1109/TCAD.2004.839485(410).

* cited by examiner

MULTI-CORE SYSTEM AND CONTROLLING OPERATION OF THE SAME

CROSS-REFERENCE TO RELATED APPLICATION

This U.S. non-provisional application claims priority under 35 USC § 119 to Korean Patent Application No. 10-2019-0095720, filed on Aug. 6, 2019, in the Korean Intellectual Property Office (KIPO), the disclosure of which is incorporated by reference herein in its entirety.

BACKGROUND

1. Technical Field

Example embodiments relate generally to semiconductor integrated circuits. For example, at least some example embodiments relate to a multi-core system and/or a method of operating a multi-core system.

2. Discussion of the Related Art

Reduction of power consumption is important in mobile devices such as a smartphone, a tablet personal computer (PC), and the like that are powered by an embedded battery because a usage time of the mobile device may increase as the power consumption is reduced. In such circumstances, a fine-grained dynamic voltage and frequency scaling (DVFS) using an integrated voltage regulator (IVR) has been introduced to enhance power efficiency of a multi-core processor having intensive power consumption. In a case when multiple processor cores operate in the same clock domain, however, effects of the fine-grained DVFS may be limited without proper cooperation with task scheduling.

SUMMARY

Some example embodiments may provide a multi-core system and/or a method of operating a multi-core system capable of enhance efficiency of fine-grained DVFS.

According to example embodiments, a method of operating a multi-core system including a plurality of processor cores, includes, monitoring a task stall time of each task of a plurality of tasks to generate a plurality of task stall information, respectively, the task stall time indicating a length of time that the each task is suspended within a task active time, the task active time indicating a length of time that a corresponding processor core of the plurality of processing core is occupied by the each task; performing task scheduling based on the plurality of task stall information; and performing a fine-grained dynamic voltage and frequency scaling (DVFS) based on the task scheduling.

According to example embodiments, a multi-core system includes a multi-core processor including a plurality of processor cores; and processing circuitry configured to, monitor a task stall time of each task of a plurality of tasks to generate a plurality of task stall information, the task stall time indicating a length of time that the each task is suspended within a task active time, the task active time indicating a length of time that a corresponding processor core is occupied by the each task, perform task scheduling based on the plurality of task stall information, and perform a fine-grained dynamic voltage and frequency scaling (DVFS) based on the task scheduling.

According to example embodiments, a method of operating a multi-core system including a plurality of processor cores, includes, monitoring a task stall time of each task of a plurality of tasks to generate a plurality of task stall information, the task stall time indicating a length of time where the each task is suspended within a task active time, the task active time indicating a length of time where a corresponding processor core is occupied by the each task, the plurality of processor cores being included in a single clock domain operating based on a same clock signal; determining, based on the plurality of task stall information, a ratio of an expectation time of applying a fine-grained DVFS to the task active time with respect to the each task to generate a plurality of fine-grained score values respectively corresponding to the plurality of tasks, respectively; assigning the plurality of tasks to the plurality of processor cores based on the plurality of fine-grained score values; determining a reference processor core among the plurality of processor cores such that a sum of the fine-grained score values of ones of the plurality of tasks assigned to the reference processor core is a maximum value among sums of ones of the plurality of tasks assigned to other ones of the plurality of processor cores; and performing the fine-grained DVFS with respect to the plurality of processor cores based on a reference core state signal associated with the reference processor core to temporarily lower a power level of the plurality of processor cores while execution of at least one of the plurality of tasks assigned to the reference processor core is suspended, the reference core state signal indicating when execution of the plurality of tasks assigned to the reference processor core is suspended.

The multi-core system and/or the method of operating the multi-core system according to example embodiments may efficiently perform task scheduling proper for the fine-grained DVFS based on the plurality of the task stall information respectively corresponding to the plurality of tasks. In comparison with conventional task scheduling based on load balancing, the plurality of tasks may be assigned to the plurality of processor cores based on load unbalancing according to example embodiments, and the effects of the fine-grained DVFS may be increased to reduce the power consumption of the multi-core system.

BRIEF DESCRIPTION OF THE DRAWINGS

Example embodiments of the present disclosure will be more clearly understood from the following detailed description taken in conjunction with the accompanying drawings.

DETAILED DESCRIPTION

Figure 1:
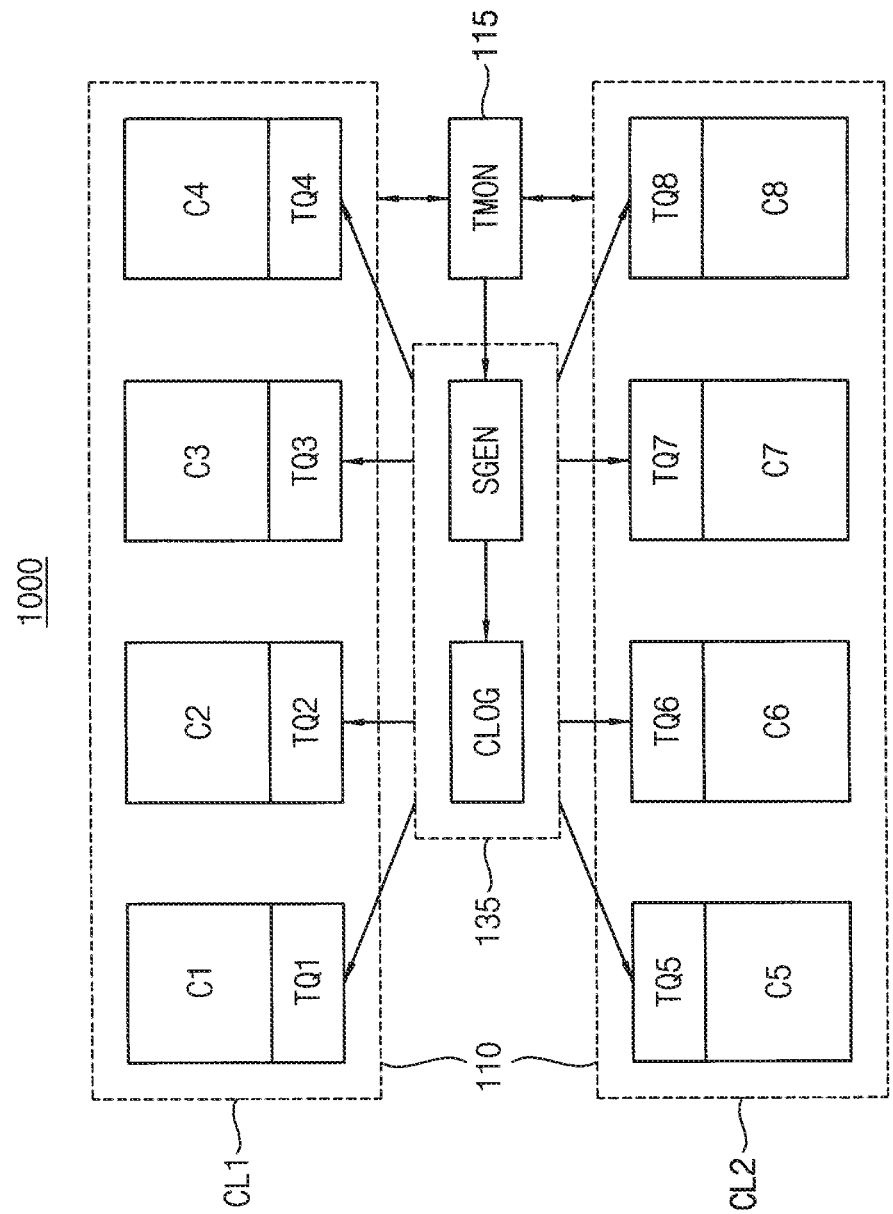
FIG. 1 is a schematic block diagram illustrating a multi-core system according to example embodiments.

Various example embodiments will be described more fully hereinafter with reference to the accompanying drawings, in which some example embodiments are shown. In the drawings, like numerals refer to like elements throughout. The repeated descriptions may be omitted.

FIG. 1 is a schematic block diagram illustrating a multi-core system according to example embodiments.

Referring to FIG. 1, a multi-core system 1000 may include a processor 110, a task scheduler 135 and a task monitor TMON 115. The multi-core system 1000 may include further components, and more detailed configuration of the multi-core system 1000 will be described below with reference to FIG. 3.

The multi-core system 1000 may be implemented as a system-on-chip that may be included in various computing devices. The multi-core system 1000 may transmit and receive data, task requests, etc. to and from a host device (not shown) through an interface. For example, the interface may be connected to the host device via a parallel AT attachment (PATA) bus, a serial AT attachment (SATA) bus, SCSI, USB, PCIe, etc.

The processor 110 may include a plurality of processor cores C1~C8 and a plurality of task queues TQ1~TQ8 respectively assigned to the plurality of processor cores C1~C8. Even though the eight processor cores C1~C8 are illustrated in FIG. 1 for convenience of illustration and description, the processor 110 may include a various number of processor cores.

The processor cores C1~C8 may be either homogeneous processor cores or heterogeneous processor cores.

When the processor cores C1~C8 are heterogeneous processor cores, they may be sorted into a first cluster CL1 and a second cluster CL2. Among the processor cores C1~C8, the first cluster CL1 may include high-performance cores C1~C4 having a first processing speed, and the second cluster CL2 may include low-performance cores C5~C8 having a second processing speed that is smaller than the first processing speed.

In some example embodiments, the processor cores C1~C8 may have per-core dynamic voltage and frequency scaling (DVFS) architecture. In the per-core DVFS architecture, the processor cores C1~C8 may be included in different power domains, and voltages having different levels and clocks having different frequencies may be supplied to the processor cores C1~C8.

In other example embodiments, the processor cores C1~C8 may have per-cluster DVFS architecture. In the per-cluster DVFS architecture, the first cluster CL1 and the second cluster CL2 may be included in different power domains, and voltages having different levels and clocks having different frequencies may be supplied to the clusters CL1 and CL2.

Power supplied to the processor cores C1~C8 may be blocked by a hotplug-out scheme. In other words, a portion of the processor cores C1~C8 may execute assigned tasks and the power to the other portion of the processor cores C1~C8 in an idle state may be blocked. In contrast, when the workload is too heavy for the powered processor cores, the power may be supplied to at least one of the processor cores in the idle state to execute the tasks, which is referred to as "hotplug-in".

The task monitor circuit 115 may provide a plurality of task stall information respectively corresponding to a plurality of tasks by monitoring a task stall time with respect to each task. The task stall time indicates a time while the each task is suspended within a task active time, and the task active time indicates a time while a corresponding processor core is occupied by the each task.

The task scheduler 135 may include a score generator SGEN and a control logic CLOG.

The task scheduler 135 may be implemented as hardware, software or a combination of hardware and software. It would be understood that the software may be a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain, or store a program for use by or in connection with an instruction execution system, apparatus, or device.

The task scheduler 135 may perform task scheduling to assign or locate the tasks to the task queues TQ1~TQ8, based on the plurality of task stall information. The task queue may be implemented as hardware within the processor core or data structure included in a kennel of an operation system (OS). The task queue may be referred to as a run queue.

Figure 2:
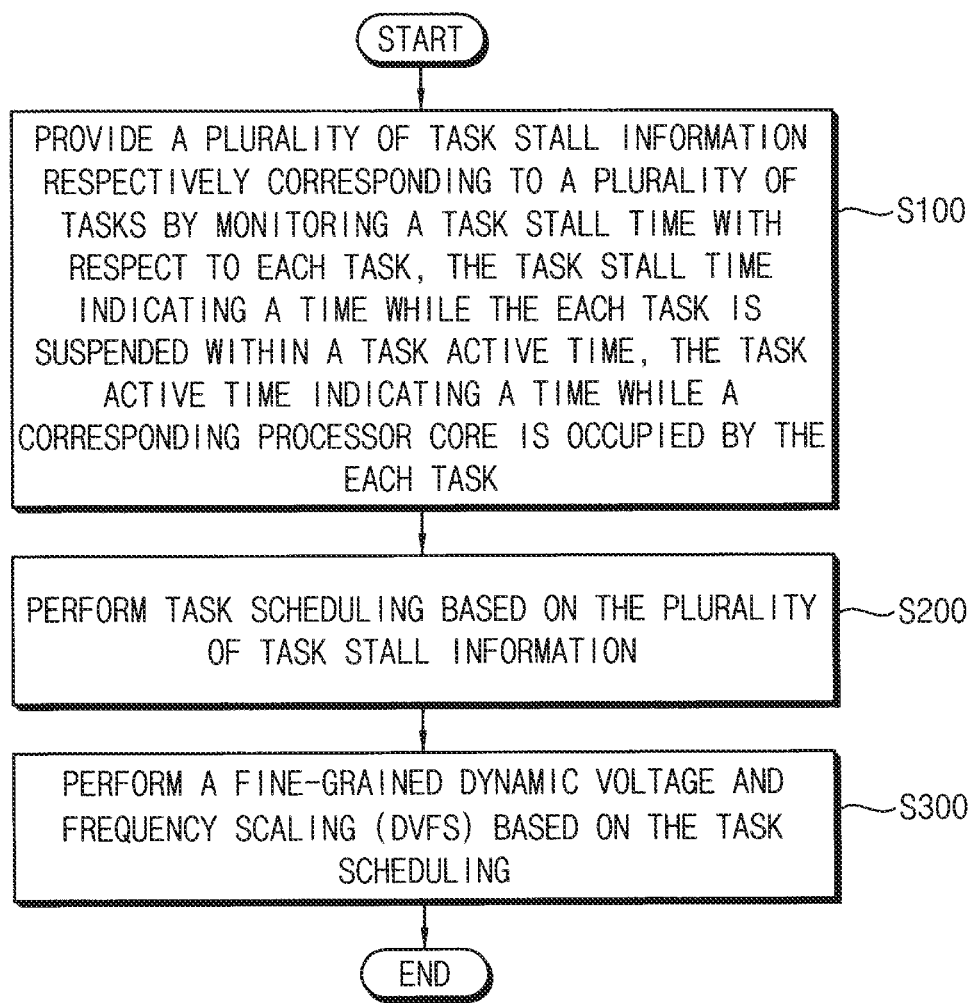
FIG. 2 is a flow chart illustrating a method of operating a multi-core system according to example embodiments.

FIG. 2 is a flow chart illustrating a method of operating a multi-core system according to example embodiments.

Referring to FIGS. 1 and 2, in operation S200, the task monitor circuit 115 may provide a plurality of task stall information respectively corresponding to a plurality of tasks by monitoring a task stall time with respect to each task, where the task stall time indicate a time while the each task is suspended within a task active time, and the task active time indicates a time while a corresponding processor core is occupied by the each task. Each task stall information may include the task active time and the task stall time of the corresponding task. According to example embodiments, each task stall information may include further information such as a task stall number indicating a suspension number of the corresponding task.

In operation S200, the task scheduler 135 may perform task scheduling based on the plurality of task stall information. In comparison with conventional task scheduling based on load balancing, the task scheduler 135 may assign the plurality tasks to the plurality of processor cores based on load unbalancing.

In some example embodiments, the score generator SGEN of the task scheduler 135 may provide a plurality of fine-grained score values respectively corresponding to the plurality of tasks based on the plurality of task stall information by measuring a ratio of an expectation time of applying the fine-grained DVFS to the task active time with respect to each task. The control logic CLOG of the task scheduler 135 may assign the plurality of tasks to the plurality of processor cores C1~C8 based on the plurality of fine-grained score values.

In operation, S300, a power managing circuit of the multi-core system 1000 may perform a fine-grained dynamic voltage and frequency scaling (DVFS) based on the task scheduling. The power managing circuit may include a power management unit and a clock control unit as will be described below with reference to FIG. 3.

The fine-grained DVFS indicates a scheme of managing a voltage and a frequency based on a unit time shorter than a few microseconds which is too short to be managed by software. In contrast, a coarse-grained DVFS indicates a scheme of managing a voltage and a frequency based on a relatively long unit time, for example, longer than a few hundred microseconds or a few milliseconds. A power level of the plurality of processor cores may be lowered temporarily by the fine-grained DVFS while execution of at least one of the plurality of tasks is suspended.

As such, the multi-core system and the method of operating the multi-core system according to example embodiments may efficiently perform the task scheduling proper for the fine-grained DVFS based on the plurality of the task stall information respectively corresponding to the plurality of tasks. In comparison with conventional task scheduling based on load balancing, the plurality of tasks may be assigned to the plurality of processor cores based on load unbalancing according to example embodiments, and the effects of the fine-grained DVFS may be increased to reduce the power consumption of the multi-core system.

Figure 3:
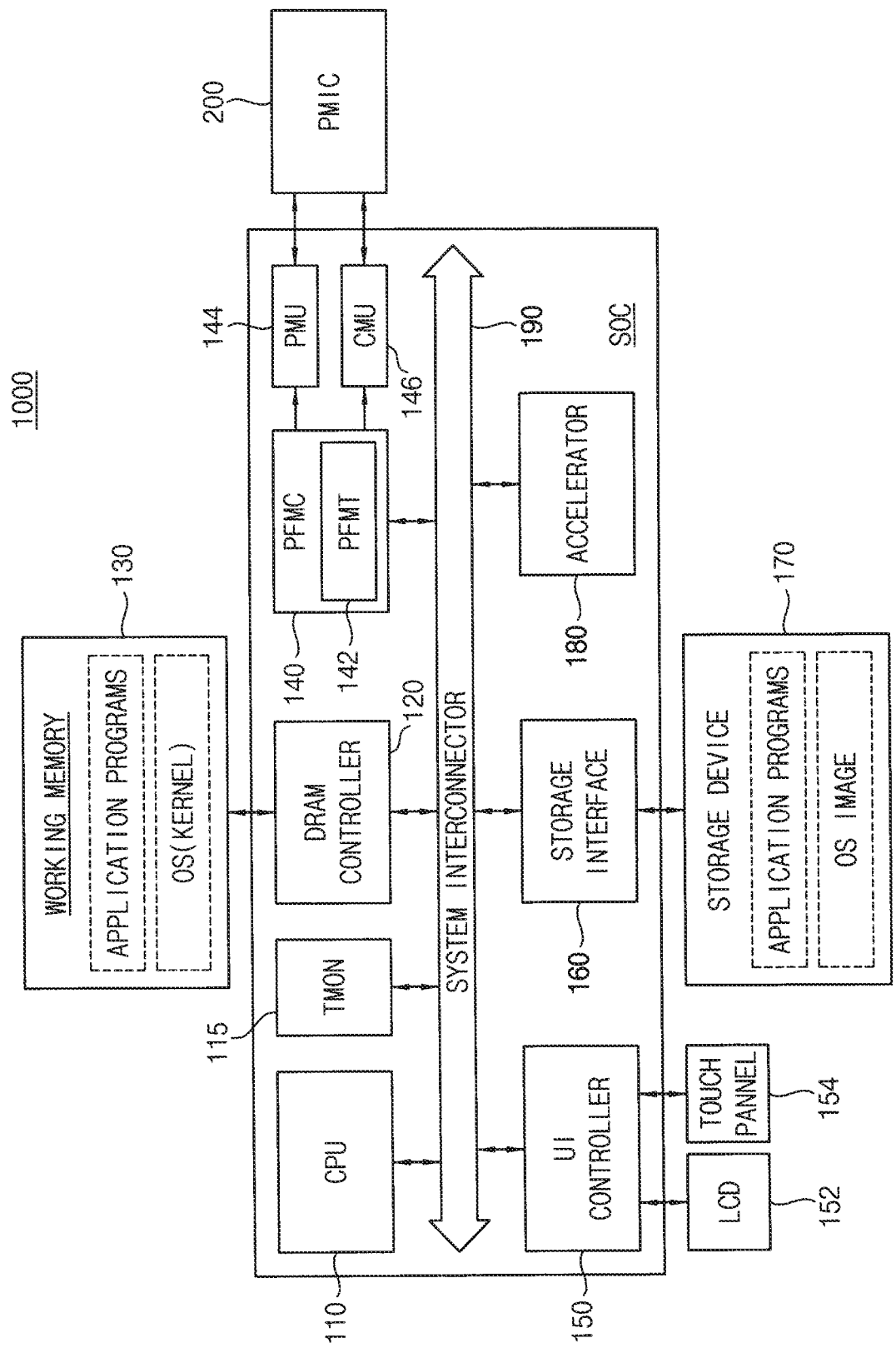
FIG. 3 is a block diagram illustrating a multi-core system according to example embodiments.

FIG. 3 is a block diagram illustrating a multi-core system according to example embodiments.

Referring to FIG. 3, the multi-core system 1000 may include a system on chip (SoC), a working memory 130, a display device (LCD) 152, a touch panel 154, a storage device 170, a power management integrated circuit (PMIC), etc. The SoC may include a central processing unit (CPU) 110, a task monitor circuit TMON 115, a DRAM controller 120, a performance controller 140, a user interface controller (UI controller) 150, a storage interface 160, and an accelerator 180, a power management unit (PMU) 144, a clock management unit (CMU) 146, etc. It will be understood that components of the multi-core system 1000 are not limited to the components shown in FIG. 3. For example, the multi-core system 1000 may further include a hardware codec for processing image data, a security block, and the like.

The processor 110 executes software (for example, an application program, an operating system (OS), and device drivers) for the multi-core system 1000. The processor 110 may execute the operating system (OS) which may be loaded into the working memory 130. The processor 110 may execute various application programs to be driven on the operating system (OS). The processor 110 may be provided as a homogeneous multi-core processor or a heterogeneous multi-core processor. A multi-core processor is a computing component including at least two independently drivable processors (hereinafter referred to as "cores" or "processor cores"). Each of the cores may independently read and execute program instructions.

Each of the processor cores of the processor 110 may include a plurality of power domains that operate with an independent driving clock and an independent driving voltage. The driving voltage and the driving clock provided to each of the processor cores may be cut off or connected in units of single cores. Hereinafter, an operation of cutting off the driving voltage and the driving clock provided to each of the power domains from a specific core will be referred to as "hotplug-out". An operation of providing the driving voltage and the driving clock to a specific core will be referred to as "hotplug-in". In addition, a frequency of the driving clock and a level of the driving voltage provided to each of the power domains may vary depending on a processing load of each core. For example, as time required for processing tasks becomes longer, each of the cores may be controlled by means of dynamic voltage frequency scaling (hereinafter referred to as "DVFS") that increases the frequency of the driving clock or the level of the driving voltage provided to a corresponding power domain. According to an example embodiment of the present inventive concepts, hotplug-in and hotplug-out may be performed with reference to the level of the driving voltage and the frequency of the driving clock of the processor 110 adjusted through DVFS.

A kernel of the operating system (OS) may monitor the number of tasks in a task queue and the driving voltage and the driving clock of the processor 110 at specific time intervals to control the processor 110. In addition, a kernel of the operating system (OS) may control hotplug-in or hotplug-out of the processor 110 with reference to the monitored information. As such, as discussed in more detail below with reference to FIG. 4, the scheduler 135 may be provided as a portion of the kennel.

The DRAM controller 120 provides interfacing between the working memory 130 and the system-on-chip (SoC). The DRAM controller 120 may access the working memory 130 according to a request of the processor 110 or another intellectual property (IP) block. For example, the DRAM controller 120 may write data into the working memory 130 according to a write request of the processor 110. Alternatively, the DRAM controller 120 may read data from the working memory 130 according to a read request of the processor 110 and transmit the read data to the processor 110 or the storage interface 160 through a data bus.

The operating system (OS) or basic application programs may be loaded into the working memory 130 during a booting operation. For example, an OS image stored in the storage device 170 is loaded into the working memory 130 based on a booting sequence during booting of the multi-core system 1000. Overall input/output operations of the multi-core system 1000 may be supported by the operating system (OS). Similarly, application programs may be loaded into the working memory 130 to be selected by a user or to provide a basic service. Moreover, the working memory 130 may be used as a buffer memory to store image data provided from an image sensor such as a camera. The working memory 130 may be a volatile memory such as a static random access memory (SRAM) and a dynamic random access memory (DRAM) or a nonvolatile memory device such as a phase-change random-access memory (PRAM), a magnetoresistive random-access memory (MRAM), a resistive random-access memory (ReRAM), a ferroelectric random-access memory (FRAM), and a NOR flash memory.

The performance controller 140 may adjust operation parameters of the system-on-chip (SoC) according to a control request provided from the kernel of the operating system (OS). For example, the performance controller 140 may adjust the level of DVFS to enhance performance of the system-on-chip (SoC). Alternatively, the performance controller 140 may control a driving mode of a multi-core processor such as Big.LITTLE (a heterogeneous computing architecture developed by ARM Holdings) of the processor 110 according to a request of the kernel. In this case, the performance controller 140 may include a performance table 142 to set a driving voltage and a frequency of a driving clock therein. The performance controller 140 may control the PMU 144 and the CMU 146, which together form the power managing circuit, connected to the PMIC 200 to provide the determined driving voltage and the determined driving clock to each power domain.

The user interface controller 150 controls user input and output from user interface devices. For example, the user interface controller 150 may display a keyboard screen for inputting data to the LCD 152 according to the control of the processor 110. Alternatively, the user interface controller 150 may control the LCD 152 to display data that a user requests. The user interface controller 150 may decode data provided from user input means, such as a touch panel 154, into user input data.

The storage interface 160 accesses the storage device 170 according to a request of the processor 110. For example, the storage interface 160 provides interfacing between the system-on-chip (SoC) and the storage device 170. For example, data processed by the processor 110 is stored in the storage device 170 through the storage interface 160. Alternatively, data stored in the storage device 170 may be provided to the processor 110 through the storage interface 160.

The storage device 170 is provided as a storage medium of the multi-core system 1000. The storage device 170 may store application programs, an OS image, and various types of data. The storage device 170 may be provided as a memory card (e.g., MMC, eMMC, SD, MicroSD, etc.). The storage device 170 may include a NAND-type flash memory with high-capacity storage capability. Alternatively, the storage device 170 may include a next-generation nonvolatile memory such as PRAM, MRAM, ReRAM, and FRAM or a NOR-type flash memory. According to an exemplary embodiment of the inventive concept, the storage device 170 may be an embedded memory incorporated in the system-on-chip (SoC).

The accelerator 180 may be provided as a separate intellectual property (IP) component to increase processing speed of a multimedia or multimedia data. For example, the accelerator 180 may be provided as an intellectual property (IP) component to enhance processing performance of a text, audio, still images, animation, video, two-dimensional data or three-dimensional data.

A system interconnector 190 may be a system bus to provide an on-chip network in the system-on-chip (SoC). The system interconnector 190 may include, for example, a data bus, an address bus, and a control bus. The data bus is a data transfer path. A memory access path to the working memory 130 or the storage device 170 may also be provided. The address bus provides an address exchange path between intellectual properties (IPs). The control bus provides a path along which a control signal is transmitted between intellectual properties (IPs). However, the configuration of the system interconnector 190 is not limited to the above description and the system interconnector 190 may further include arbitration means for efficient management.

The task monitor circuit 115 may provide a plurality of task stall information respectively corresponding to a plurality of tasks. The task monitor circuit will be further described below with reference to FIGS. 5 through 8.

Figure 4:
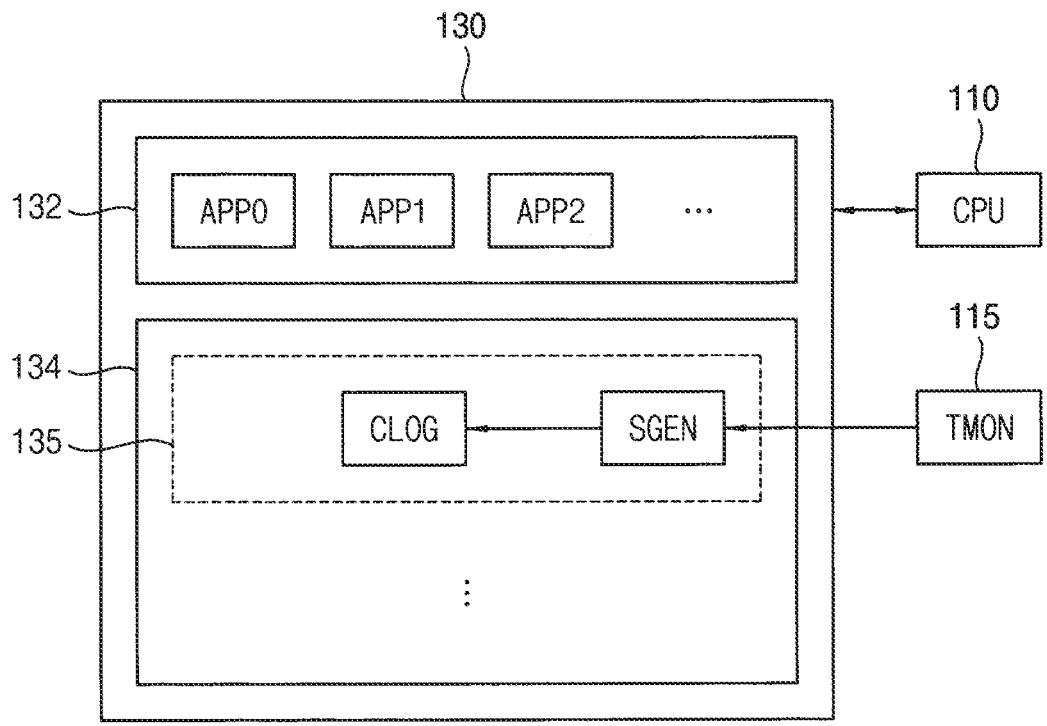
FIG. 4 is a diagram illustrating an example embodiment of a task scheduler implemented in the multi-core system of FIG. 3.

FIG. 4 is a diagram illustrating an example embodiment of a task scheduler implemented in the multi-core system of FIG. 3.

FIG. 4 illustrates a software structure of the multi-core system 1000 shown in FIG. 3. Referring to FIG. 3, a software layer structure of the multi-core system 1000 loaded into the working memory 130 and driven by the CPU 110 may be divided into an application program 132 and a kernel 134. The operating system (OS) may further include one or more device drivers to manage various devices such as a memory, a modem, and an image processing device.

The application program 132 may be upper layer software driven as basic service or driven by a user's request. A plurality of application programs App0, App1 and App2 may be simultaneously executed to provide various services. The application programs App0, App1 and App2 may be executed by the CPU 110 after being loaded into the working memory 130. For example, when playing a video file is requested by the user, an application program (e.g., video player) is executed to play the video file. Then the executed player may generate a read request or a write request to the storage device 170 to play the video file requested by the user.

The kernel 134, as a component of the operating system (OS), performs a control operation between the application program 132 and hardware. The kernel 134 may include program execution, interrupt, multi-tasking, memory management, a file system, and a device driver. The scheduler 135 may be provided as a portion of the kennel 134.

The scheduler or the task scheduler 135 monitors and manages a task queue for each of the processor cores. The task queue is a queue of active tasks when a plurality of tasks are simultaneously performed. For example, tasks existing in the task queue may be quickly processed by the processor 110, as compared to other tasks. The scheduler 135 may determine a subsequent process with reference to task information loaded into the task queue. For example, the scheduler 135 decides the priority of CPU resources according to a value of the task queue. In a Linux kernel, a plurality of task queues correspond to a plurality of processor cores, respectively.

The scheduler 135 may assign the tasks respectively corresponding to the task queues to corresponding cores, respectively. The task loaded into the task queue to be performed by the processor 110 is called a runnable task.

According to example embodiments, the scheduler 135 may include a score generator SGEN and a control logic CLOG.

The score generator SGEN, as described above, may provide a plurality of fine-grained score values respectively corresponding to the plurality of tasks based on the plurality of task stall information by measuring a ratio of an expectation time of applying the fine-grained DVFS to the task active time with respect to the each task. The expectation time of applying the fine-grained DVFS corresponds to a time while a power level of the corresponding processor core is lowered without performance degradation of the corresponding processor core. The control logic CLOG may assign the plurality of tasks to the plurality of processor cores based on the plurality of fine-grained score values.

Figure 5:
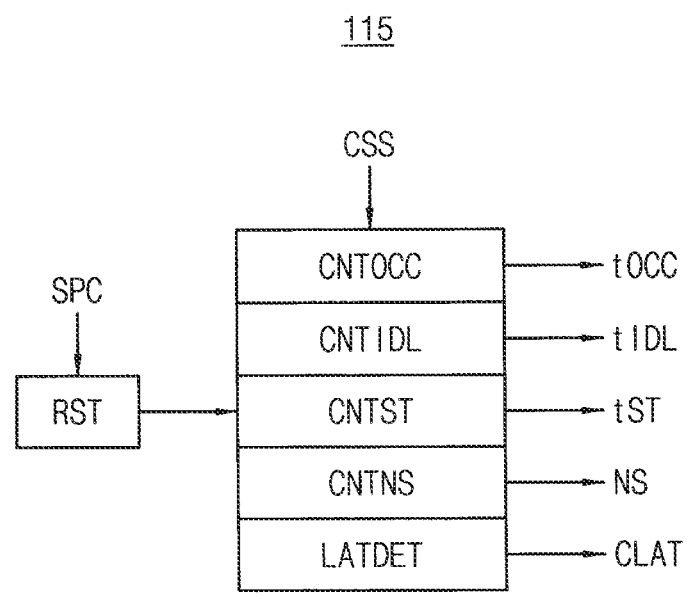
FIG. 5 is a diagram illustrating an example embodiment of a task monitor circuit included in a multi-core system according to example embodiments.
Figure 6:
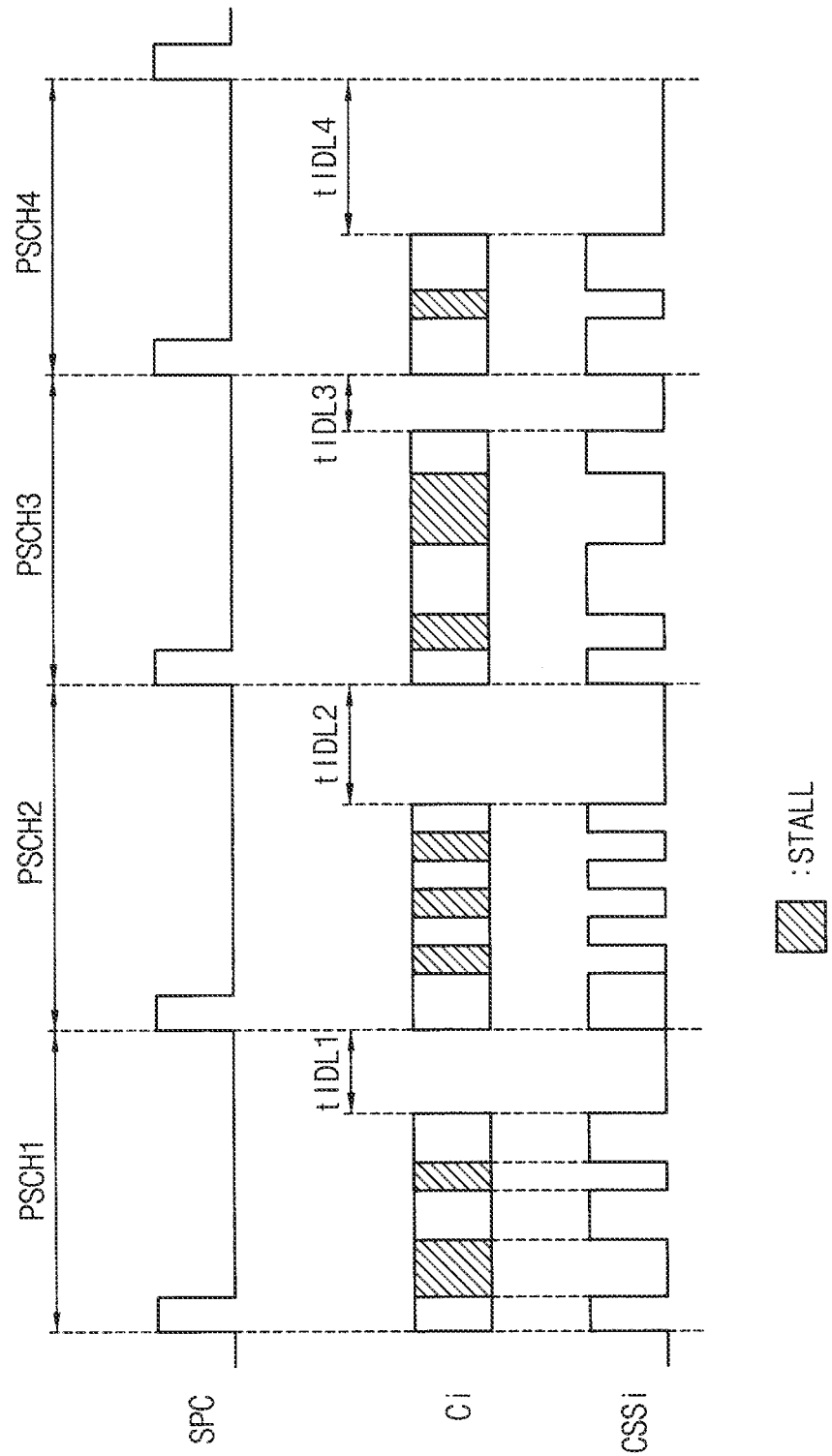
FIGS. 6, 7 and 8 are diagrams for describing task stall information for a method of operating a multi-core system according to example embodiments.
Figure 7:
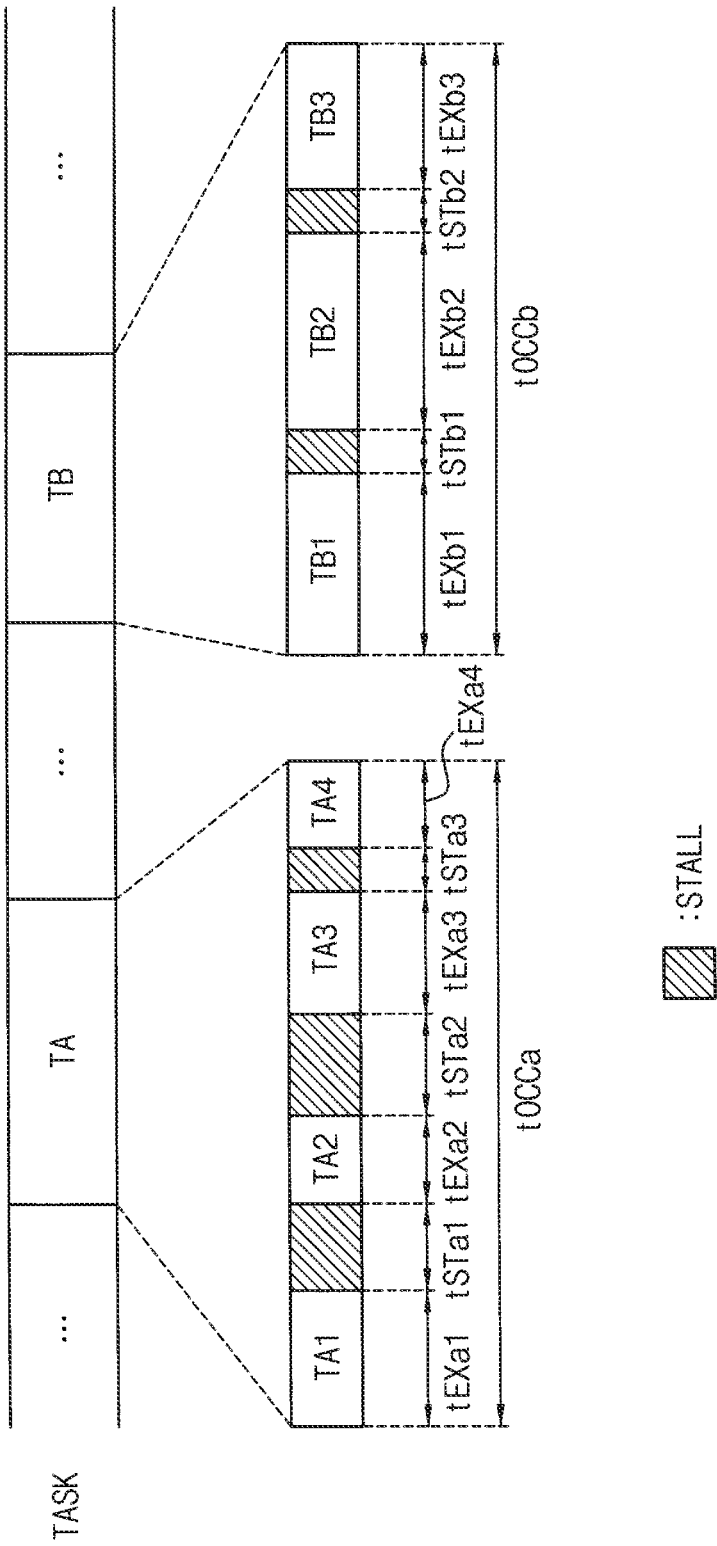
Figure 8:
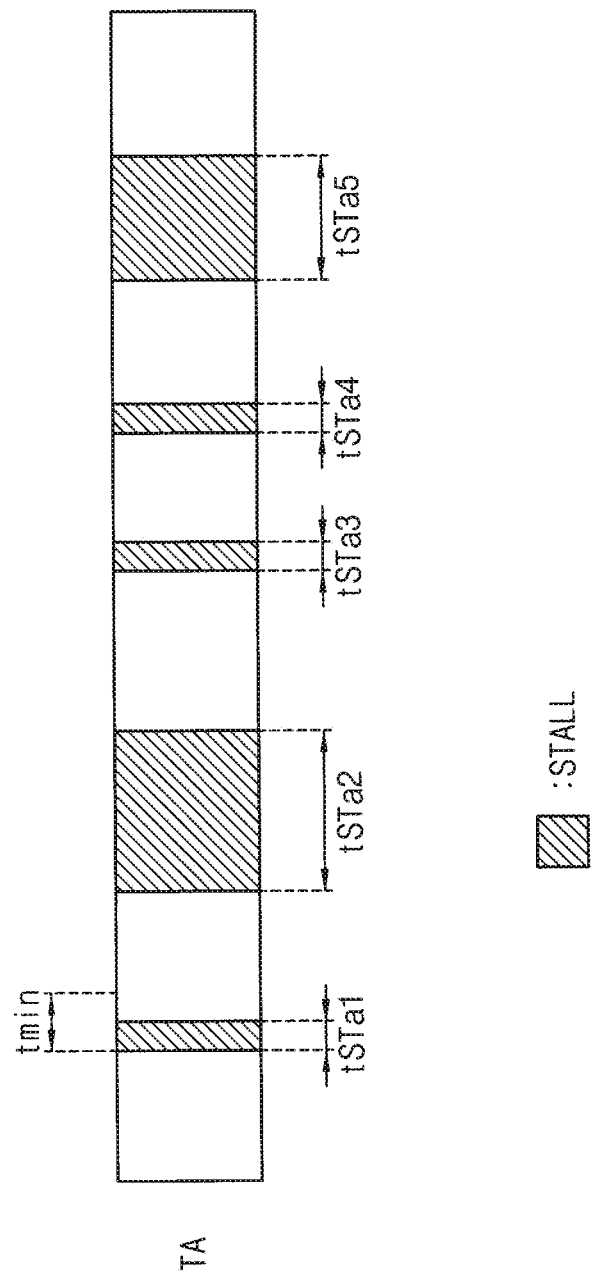

FIG. 5 is a diagram illustrating an example embodiment of a task monitor circuit included in a multi-core system according to example embodiments, and FIGS. 6, 7 and 8 are diagrams for describing task stall information for a method of operating a multi-core system according to example embodiments.

Referring to FIGS. 5 through 8, the task monitor circuit 115 may include a reset circuit RST and a plurality of measurement circuits. The plurality of measurement circuits may include an active time counter CNTOCC, an idle time counter CNTIDL, a stall time counter CNTST, a stall number counter CNTNS, a latency detector LATDET, etc.

The reset circuit RST may initialize at least a portion of the plurality of measurement circuits in response to a scheduling timing signal SPC indicating a timing period. The active time counter CNTOCC may provide a task active time tOCC indicating a time while the processor core is occupied by the task based on a core state signal CSS indicating when the task assigned to the processor core is suspended. The idle time counter CNTIDL may provide a core idle time tIDL indicating a time while the processor core is in an idle state based on the core state signal CSS. The stall time counter CNTST may provide a task stall time tST indicating a time while the task is suspended within the task active time tOCC. The stall number counter CNTNS may provide a task stall number NS indicating a suspension number of the task based on the core state signal CSS. The latency detector LATDET may provide a latency CLAT of transactions between the multi-core system and an external device. The task active time tOCC, the task stall time tST and the task stall number NS may be measured with respect to each of the plurality of tasks, and the core idle time tIDL may be measured with respect to each of the plurality of processor cores. The latency CLAT may be measured with respect to each task or each processor core. The above-described task stall information may include at least one of the task active time tOCC, the task stall time tST, the task stall number and the core idle time tIDL. The latency CLAT may be used to control a timing of the fine-grained DVFS.

Referring to FIG. 6, one or more tasks may be periodically assigned to and processed by a processor core Ci according to scheduling periods of the same time interval. FIG. 6 illustrates an example of first through fourth scheduling periods PSCH1~PSCH4. The scheduling timing signal SPC may indicate the scheduling periods, and the core state signal CSS may indicate whether the processor core Ci is executing the tasks or execution of the tasks is suspended. The core idle times tIDL1~tIDL4 may be varied depending on the scheduling periods PSCH1~PSCH4.

FIG. 7 illustrates a first task TA and a second task TB as examples for describing the task stall information according to example embodiments. In case of the first task TA, the first task active time tOCCa corresponds to a sum of the first stall time tSTa1+tSTa2+tSTa3 and the first task execution time tEXa1+tEXa2+tEXa3+tEXa4, and the first stall number NSa corresponds to three. In case of the second task TB, the second task active time tOCCb corresponds to a sum of the second stall time tSTb1+tSTb2 and the second task execution time tEXb1+tEXb2+tEXb3, and the second stall number NSb corresponds to two.

In some example embodiments, a plurality of fine-grained score values respectively corresponding to the plurality of tasks may be based on the plurality of task stall information by calculating a ratio of the task stall time to the task active time with respect to each task. In case of FIG. 7, a value of (tSTa1+tSTa2+tSTa3)/tOCCa may be provided as a first fine-grained score value corresponding the first task TA, and a value of (tSTb1+tSTb2+)/tOCCb may be provided as a second fine-grained score value corresponding the second task TB.

In other example embodiments, a level changing time may be determined with respect to each task based on the task stall number, where the level changing time corresponds to a time that is required to change a power level of the plurality of processor cores. An expectation time with respect to the each task may be calculated by subtracting the level changing time from the task stall time. The plurality of fine-grained score values respectively corresponding to the plurality of tasks may be provided by calculating a ratio of the expectation time to the task active time with respect to the each task. The level changing time may be in proportional to the task stall number. In case of FIG. 7, a value of [(tSTa1+tSTa2+tSTa3)−k*NSa]/tOCCa may be provided as a first fine-grained score value corresponding the first task TA, and a value of [(tSTb1+tSTb2+)−k*NSb]/tOCCb may be provided as a second fine-grained score value corresponding the second task TB. Here, k is a constant as will be described below with reference to FIG. 17.

Referring to FIG. 8, a reference suspension time tmin may be determined based on a period of changing a power level by the fine-grained DVFS. The processor core may be in the stall state while the next instruction of the task cannot be executed, for example, because the processor core has to wait for a response from an external circuit block such as a memory, hardware accelerator, and the like. If the stall state lasts for a short time (e.g., a few or tens of clock cycles) in cases such as a L1 cache miss, the effects of the fine-grained DVFS may be trivial. In contrast, if the stall state lasts for a long time (e.g., more than hundreds of clock cycles) in cases such as a LLC cache miss, the meaningful reduction of the power consumption may be possible by applying the fine-grained DVFS. The reference suspension time tmin corresponding to a specific threshold value may be determined time granularity of the fine-grained DVFS, and the task stall number and the task stall time may be determined by monitoring only the stall state lasting longer than the reference suspension time tmin. In the example of FIG. 8, the stall times tSTa1, tSTa3 and tSTa4 less than the reference suspension time tmin may be excluded from the measurement of the task stall time corresponding to the first task TA. As a result, the task stall time of the first task TA may be provided as tSTa2+tSTa5, and the task stall number of the first task TA may be two.

FIGS. 9, 10, 11 and 12 are diagram illustrating task scheduling according to example embodiments.

Figure 9:
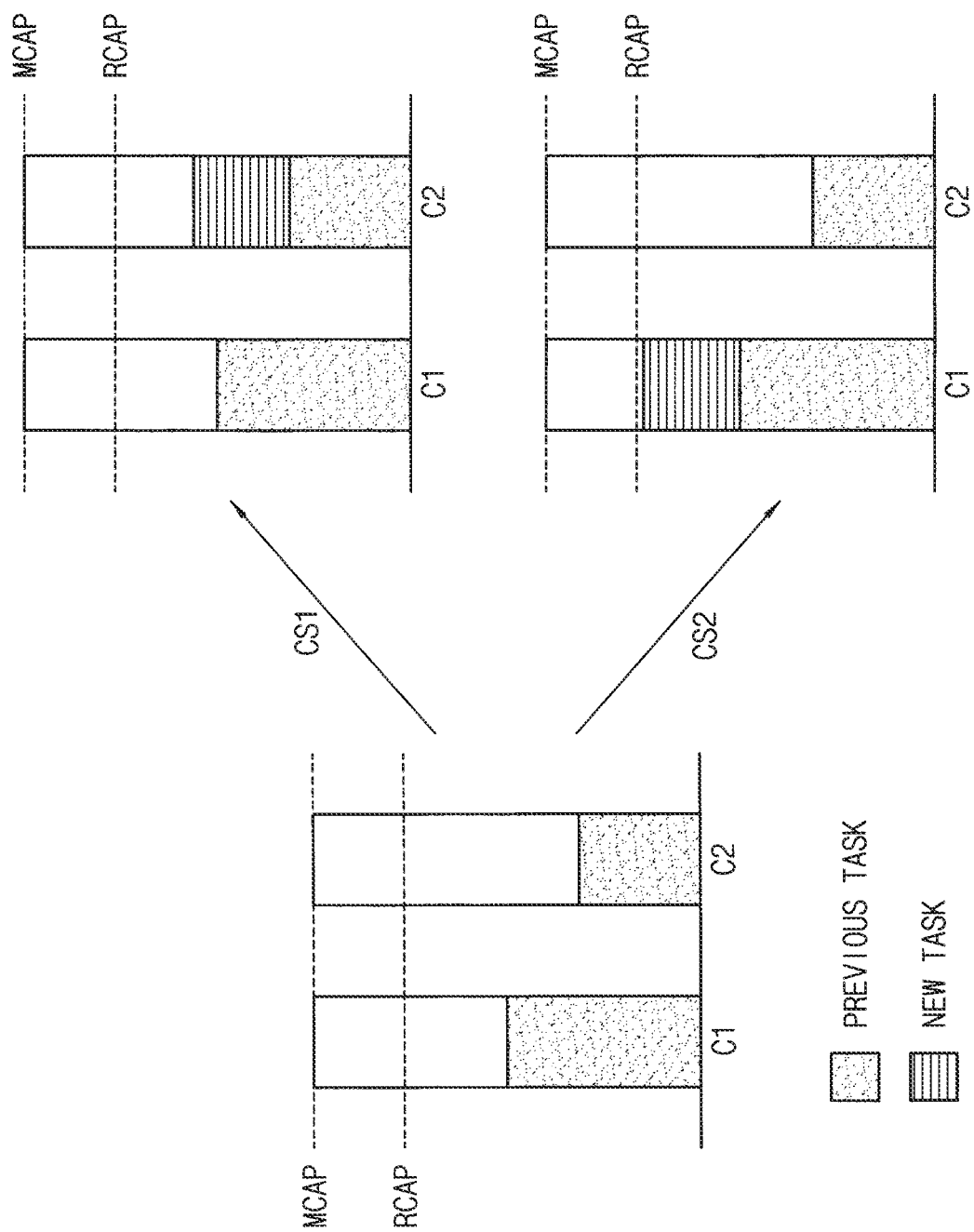
FIGS. 9, 10, 11 and 12 are diagram illustrating task scheduling according to example embodiments.
Figure 10:
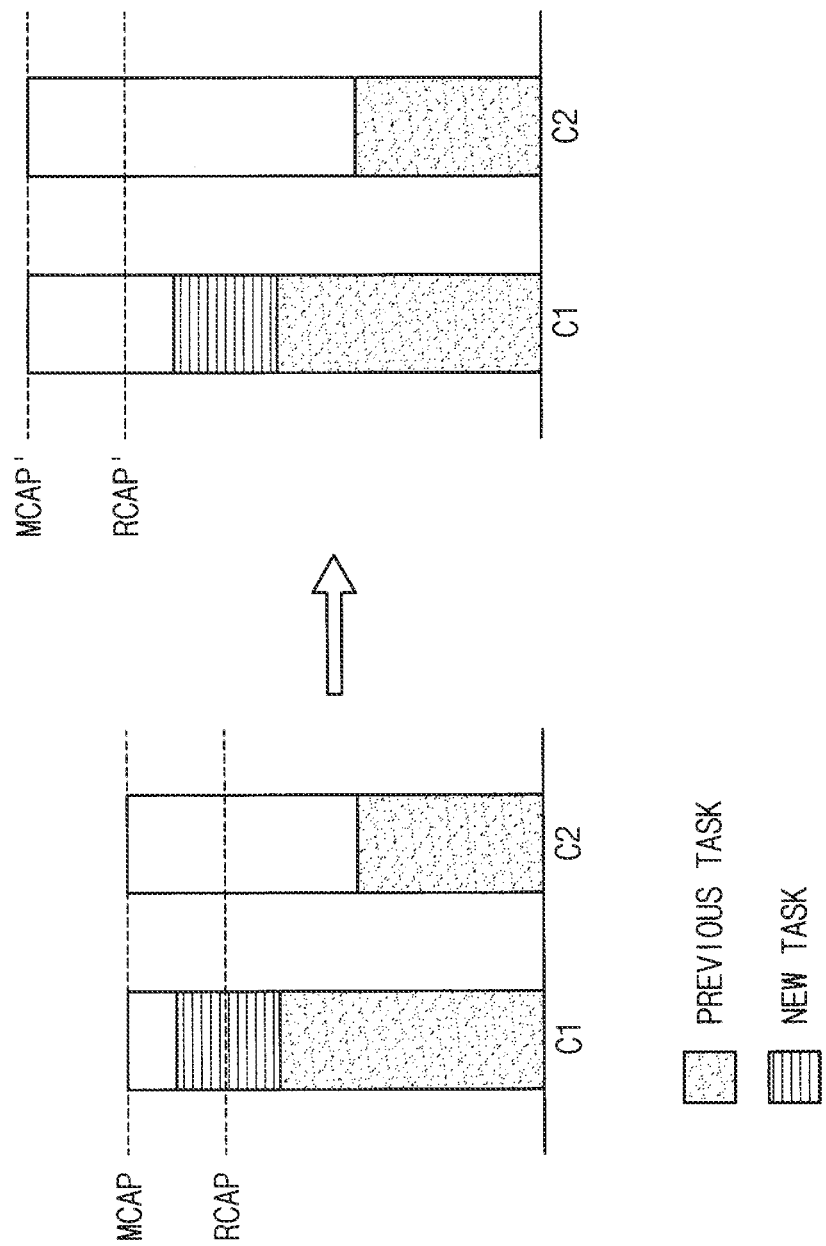

In FIGS. 9 and 10, only two processor cores included in one cluster are illustrated. It will be understood that example embodiments may be applied to a plurality of clusters including various numbers of processor cores.

In most of smartphones or other mobile devices, a processor is classified into multiple clusters (e.g., Big.LITTLE) to optimize power efficiency and performance, and each cluster includes a plurality of processor cores operating based on the same clock signal. In such circumstances, the conventional scheduler selects one cluster proper for the kind of tasks and/or the workloads, and distributes the tasks evenly to the processor cores in the selected cluster so as to lower the voltage and the clock frequency of the selected cluster. This is because the dynamic power increased by raising the power level is much higher than the static power required for powering on a new processor core.

If a new task has to be assigned in a circumstance of a left portion of FIG. 9, the new task may be assigned to the second processor core C2 based on load balancing as a first case CS1 such that the workloads of the first and second processor cores C1 and C2 may be determined as evenly as possible. In contrast, as a second case CS2, the new task may be assigned to the first processor core C1 such that the workloads of the first and second processor cores C1 and C2 may be unbalanced.

Power consumption amounts of the first case CS1 and the second case CS2 may be determined to select the task scheduling among the first case CS1 and the second case CS2.

The power consumption amount of a multi-core processor may be calculated as Expression 1.

$$Ptotal=\Sigma_i\{PCLSi+\Sigma_j(PCRSij+PCRDij)\} \quad \text{Expression 1}$$

In Expression 1, $\Sigma_i$ indicates a summation for operating clusters, $\Sigma_j$ indicates a summation for operating processor cores, PCLSi indicates a static power of each cluster, PCRSij indicates a static power of each processor core, and PCRDij indicates a dynamic power of each processor core.

The static power of the cluster and the processor core may be determined according to an operation frequency and a voltage, and the dynamic power of the processor core may be determined according to the operation frequency, the voltage and an amount of workloads. The dynamic power may be calculated using the fine-grained score value as Expression 2.

$$PCRDij=\Sigma_k\{P(fo)*WLk*(1-SCRk)+P(fm)*WLk*SCRk\} \quad \text{Expression 2}$$

In Expression 2, $\Sigma_k$ indicates a summation for the tasks assigned to the i-th processor core in the j-th cluster, P(fo) indicates a power corresponding to the operation frequency fo, P(fm) indicates a power corresponding to a reduced frequency fm by the fine-grained DVFS, WLk indicates the workload of each task, and SCRk indicates the fine-grained score value of each task.

In some example embodiments, a first power consumption amount of the fine-grained DVFS may be determined based on a first task scheduling by which the plurality of tasks are assigned to the plurality of processor cores based on the plurality of fine-grained score values. Also a second power consumption amount corresponding to a second task scheduling by which the plurality of tasks are assigned to the plurality of processor cores based on load balancing. One of the first task scheduling and the second task scheduling may be selected based on a comparison result of the first power consumption amount and the second power consumption amount.

Figure 11:
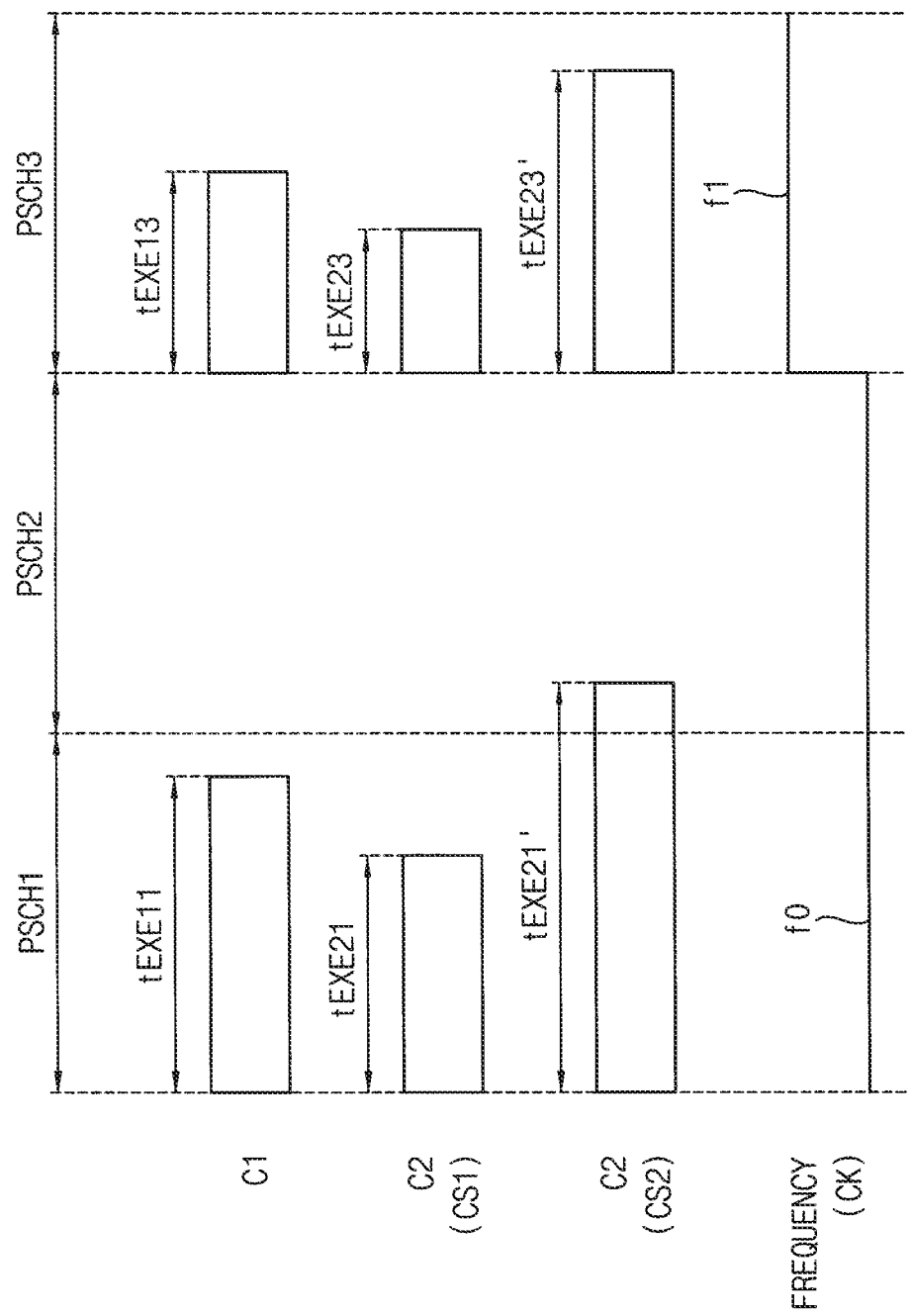
Figure 12:
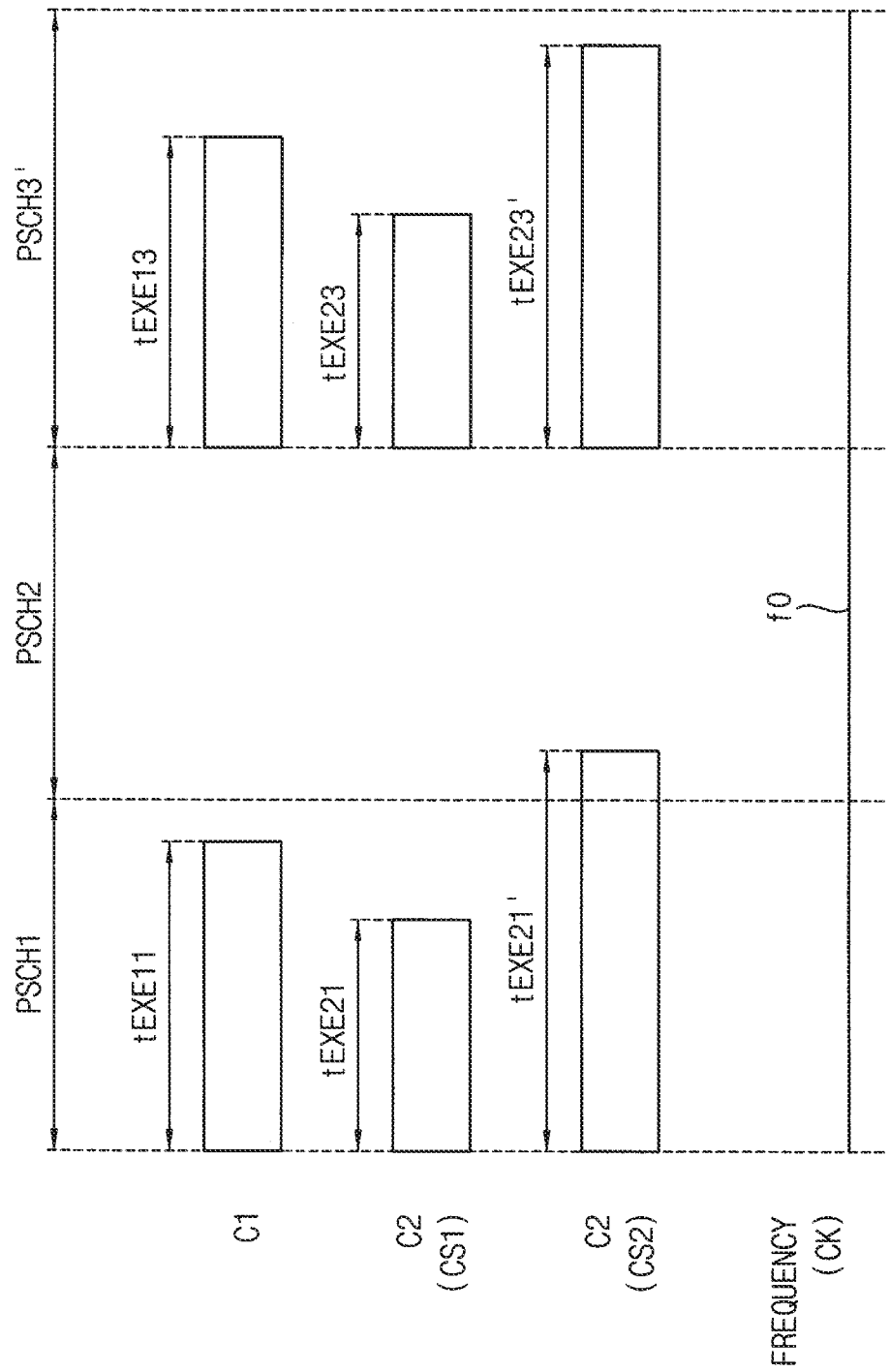

As illustrated in a left portion of FIG. 10, the workload of a processor core (e.g., the first processor core C1) may be increased by assigning a new task to be greater than a reference capacity RCAP that is a criterion of changing a power level. In this case, as illustrated in a right portion of FIG. 10, the power level of the cluster including the first and second processor cores C1 and C2 has to be increased such that the maximum capacity and the reference capacity may be increased from MCAP and RCAP to MCAP' and RCAP'. The increase of the maximum capacity and the reference capacity may be implemented as illustrated in FIGS. 11 and 12. When the fine-grained DVFS is performed based on the first processor core C1, the core execution time tEXE11 of the first processor core C1 may be substantially maintained as illustrated in FIGS. 11 and 12. In contrast, for the second processor core C2 included in the same clock domain as the first processor core C1, the core execution time tEXE21' of a second case CS2 when the fine-grained DVFS based on the first processor core C1 is performed may be increased longer than the core execution time tEXE21 of a first case CS1 when the fine-grained DVFS is not performed. As a result, the core execution time tEXE21' of the second processor core C2 for the second case may exceed the first scheduling period PSCH1. In this case, the core execution delay may be caused such that the tasks assigned to the second processor core C2 may not be completed in the first scheduling period PSCH1, and the above-described control logic CLOG of the task scheduler 135 cannot perform the task scheduling for the second scheduling period PSCH2.

In some example embodiments, as illustrated in FIG. 11, when at least one of core execution times of the plurality of processor cores is increased by performing the fine-grained DVFS to be greater than a maximum execution time (e.g., a scheduling time), a power level of the plurality of processor cores may be raised by performing a coarse-grained DVFS. For example, the operation frequency may be increased from fo to f1 in the third scheduling period PSCH3. As a result, the core execution times tEXE13, tEXE23 and tEXE23' in the third scheduling period PSCH3 may be reduced shorter than those of the first scheduling period PSCH1 and the assigned tasks may be executed successfully within the maximum execution time.

In some example embodiments, as illustrated in FIG. 12, when at least one of core execution times of the plurality of processor cores is increased by performing the fine-grained DVFS to be greater than the maximum execution time, a scheduling period of updating the task scheduling with respect to the plurality of processor cores may be increased. For example, the operation frequency may be maintained as fo, but the third scheduling period PSCH3 may be increased longer than the first scheduling period PSCH1 so that the assigned tasks may be executed successfully within the maximum execution time.

Figure 13:
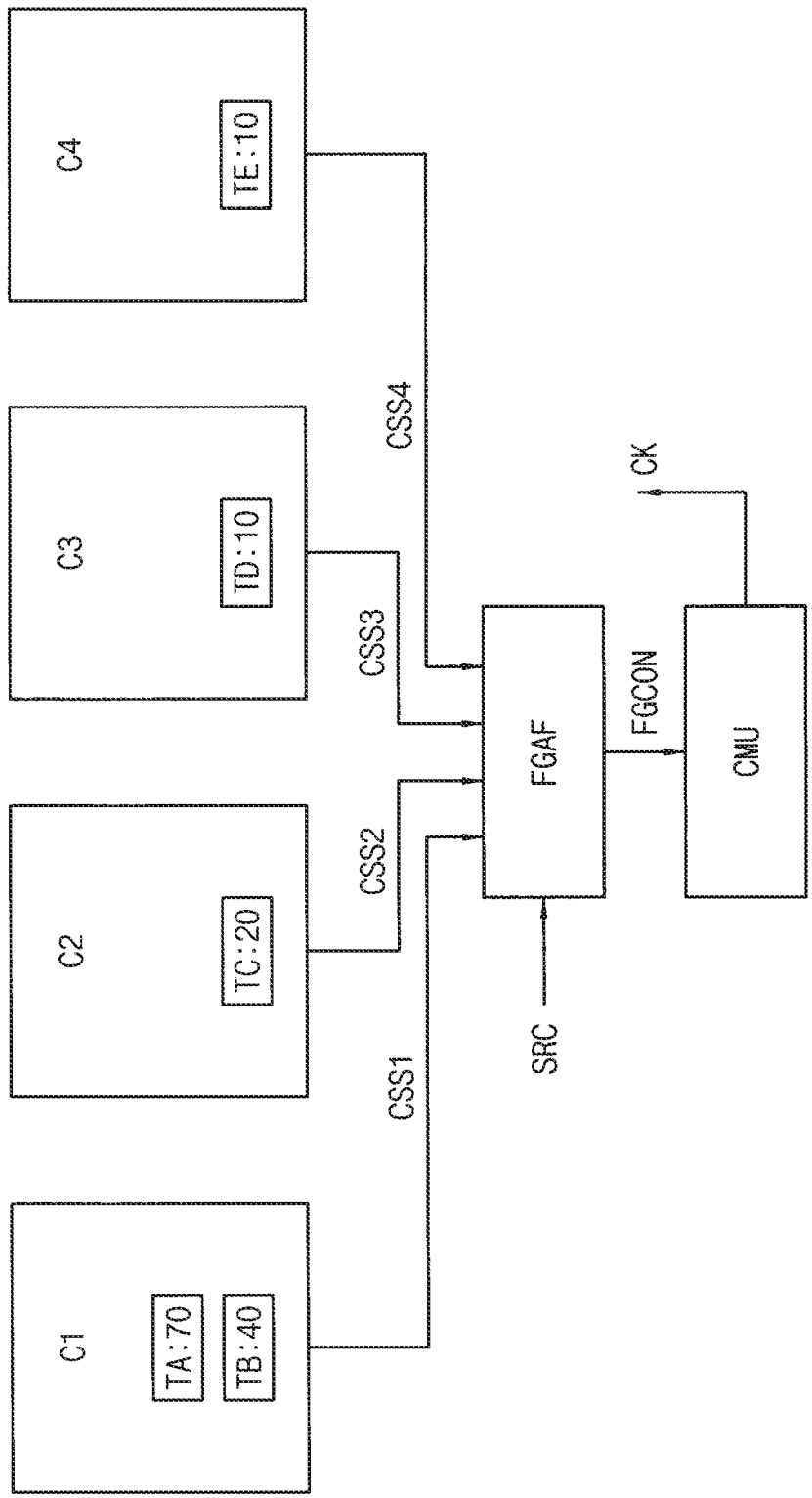
FIGS. 13 and 14 are diagrams illustrating an example embodiment of fine-grained DVFS for a method of operating a multi-core system according to example embodiments.
Figure 14:
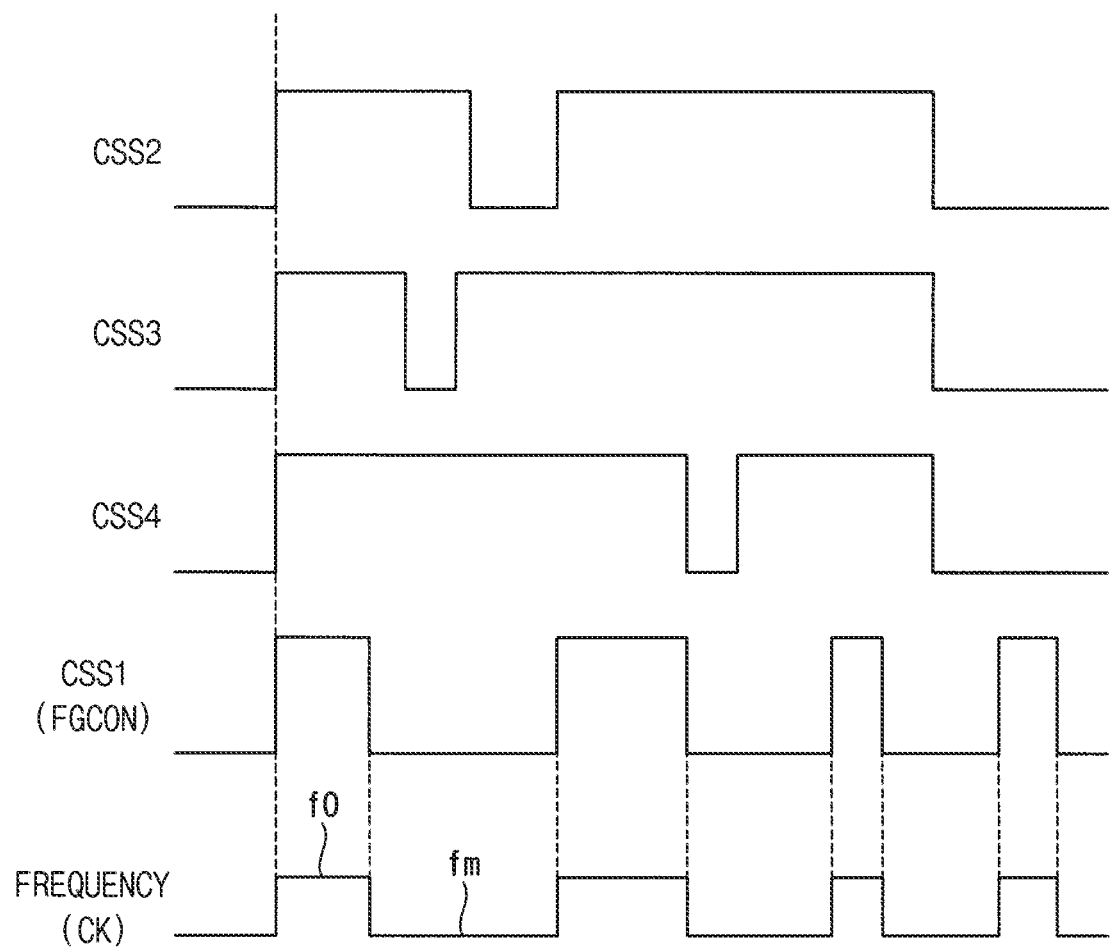

FIGS. 13 and 14 are diagrams illustrating an example embodiment of fine-grained DVFS for a method of operating a multi-core system according to example embodiments.

FIG. 13 illustrates, as a non-limiting example, first through fourth processor cores C1~C4 included in a single clock domain, scheduled tasks TA~TE and fine-grained score values respectively corresponding to the tasks TA~TE. For example, the fine-grained score value of the task TA is 70, the fine-grained score value of the task TB is 40, and so on.

The task scheduler may determine a reference processor core among the plurality of processor cores C1~C4 included in the single clock domain, such that a sum of the fine-grained score values of the tasks assigned to the reference processor core C1 may be a maximum value among sums of the tasks respectively assigned to of the other processor cores C1~C4. In the example of FIG. 13, the sum of the fine-grained score value of the first processor core C1 has the maximum value, the task scheduler may provide a signal SRC indicating that the first processor core C1 is the reference processor core.

A fine-grained affinity block FGAF may receive the signal SRC, and perform the fine-grained DVFS with respect to the plurality of processor cores C1~C4 based on a reference core state signal, that is, the first core state signal CSS1 indicating when execution of the tasks assigned to the reference processor core C1 is suspended such that a power level of the plurality of processor cores C1~C4 in the signal clock domain may be lowered temporarily by the fine-grained DVFS while execution of at least one of the tasks assigned to the reference processor core C1 is suspended. As such, the fine-grained affinity block FGAF may provide a control signal FGCON indicating the timing of the fine-grained DVFS. The clock management unit CMU may change the frequency of the clock signal CK in synchronization with the control signal FGCON as the fine-grained DVFS for the plurality of processor cores C1~C4. The power level of the plurality of processor cores C1~C4 may be lowered temporarily by the fine-grained DVFS while execution of at least one of the plurality of tasks is suspended. For example, the operation frequency may be lowered from fo to fm during the stall states of the reference processor core (e.g., the first processor core C1) based on the control signal FGCON or the reference core state signal (e.g., the first core state signal CSS1).

Figure 15:
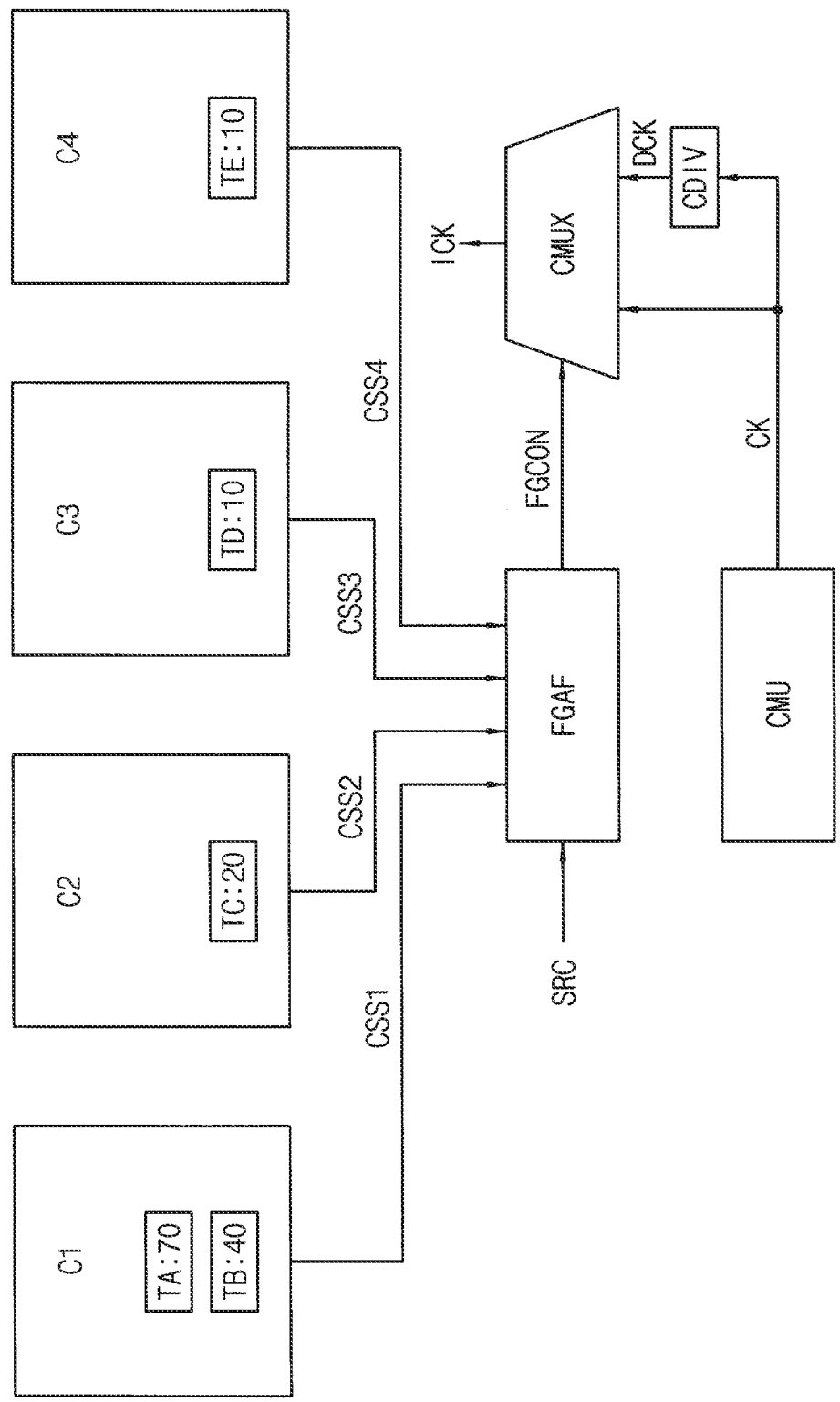
FIGS. 15 and 16 are diagrams illustrating another example embodiment of fine-grained DVFS for a method of operating a multi-core system according to example embodiments.
Figure 16:
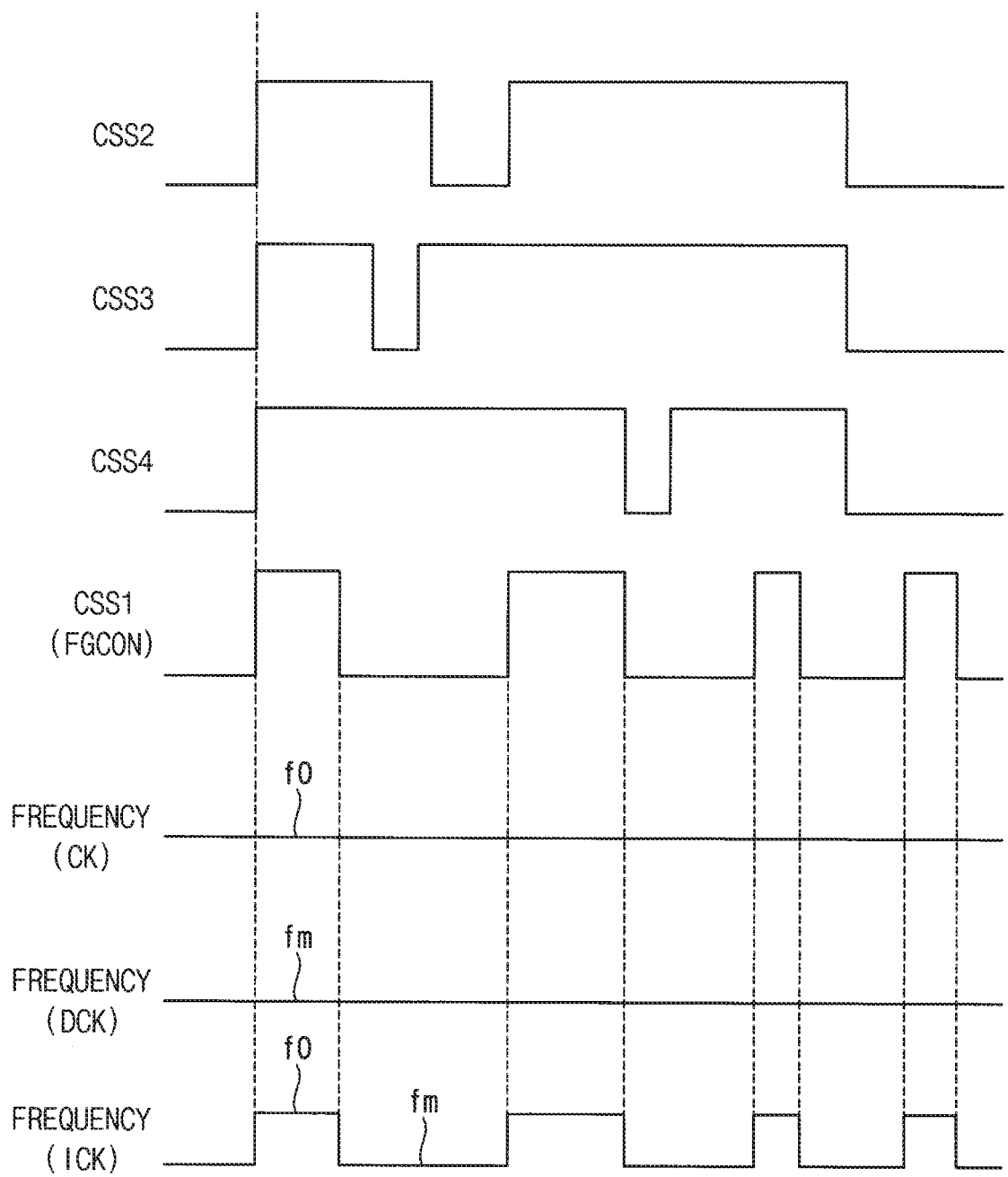

FIGS. 15 and 16 are diagrams illustrating another example embodiment of fine-grained DVFS for a method of operating a multi-core system according to example embodiments. The descriptions repeated with FIG. 13 an 14 may be omitted.

Referring to FIGS. 15 and 16, a clock divider CDIV and a clock multiplexer CMUX may be used to implement the fine-grained DVFS. The clock management unit CMU may provide the clock signal CK having the operation frequency fo that is determined by the coarse-grained DVFS. The clock divider CDIV may provide a division clock signal DCK having a reduced frequency fm lower than the operation frequency fo by dividing the clock signal CK. The clock multiplexer CMUX may select one of the clock signal CK and the division clock signal DCK in response to the control signal FGCON to provide an internal clock signal ICK to the processor cores C1~C4. As a result, the same fine-grained DVFS as FIGS. 13 and 14 may be implemented using the clock divider CDIV and the clock multiplexer CMUX.

Figure 17:
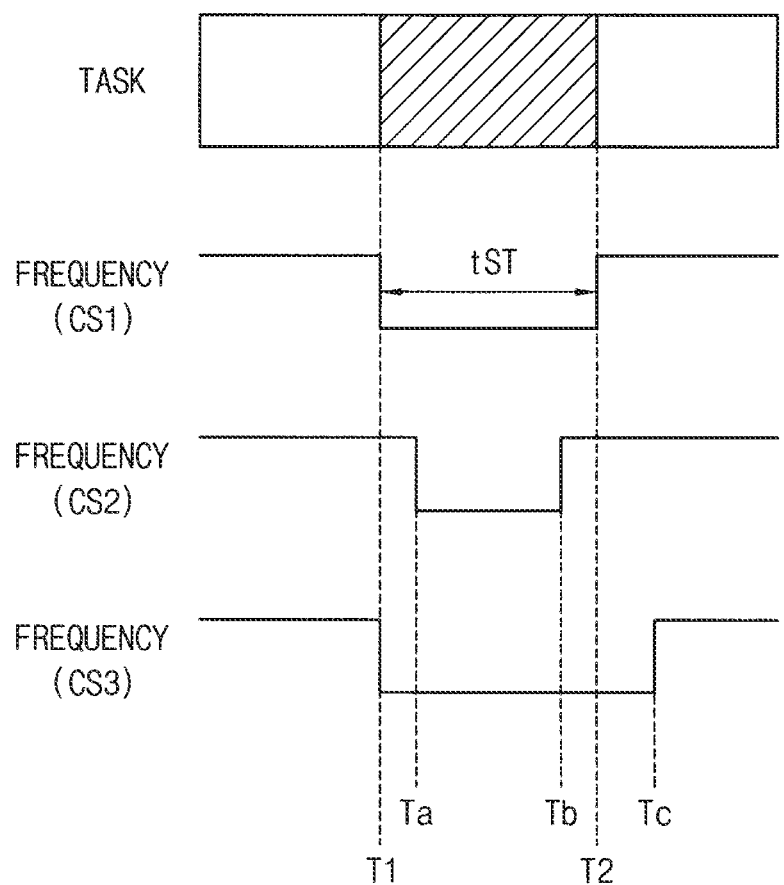
FIG. 17 is a diagram illustrating example embodiments of timing control of fine-grained DVFS for a method of operating a multi-core system according to example embodiments.

FIG. 17 is a diagram illustrating example embodiments of timing control of fine-grained DVFS for a method of operating a multi-core system according to example embodiments.

FIG. 17 illustrates one stall period tST and timings of the fine-grained DVFS changing an operation frequency, that is, the timings of changing an operation frequency. The first case CS1 corresponds to an ideal case that the timings of the fine-grained DVFS coincide with the start time point T1 and the end time point T2 of the stall period tST. The second case CS2 indicates that the operation frequency is lowered after the start time point T1 and raised before the end time point T2. The third case CS2 indicates that the operation frequency is raised after the end time point T2 of the stall period tST. If the end time point T2 of the stall period tST can be expected, the operation frequency may be raised in advance before the end time point T2 to prevent performance degradation of the processor cores. In some example embodiments, the end time point T2 may be expected using a latency as described below.

Figure 18:
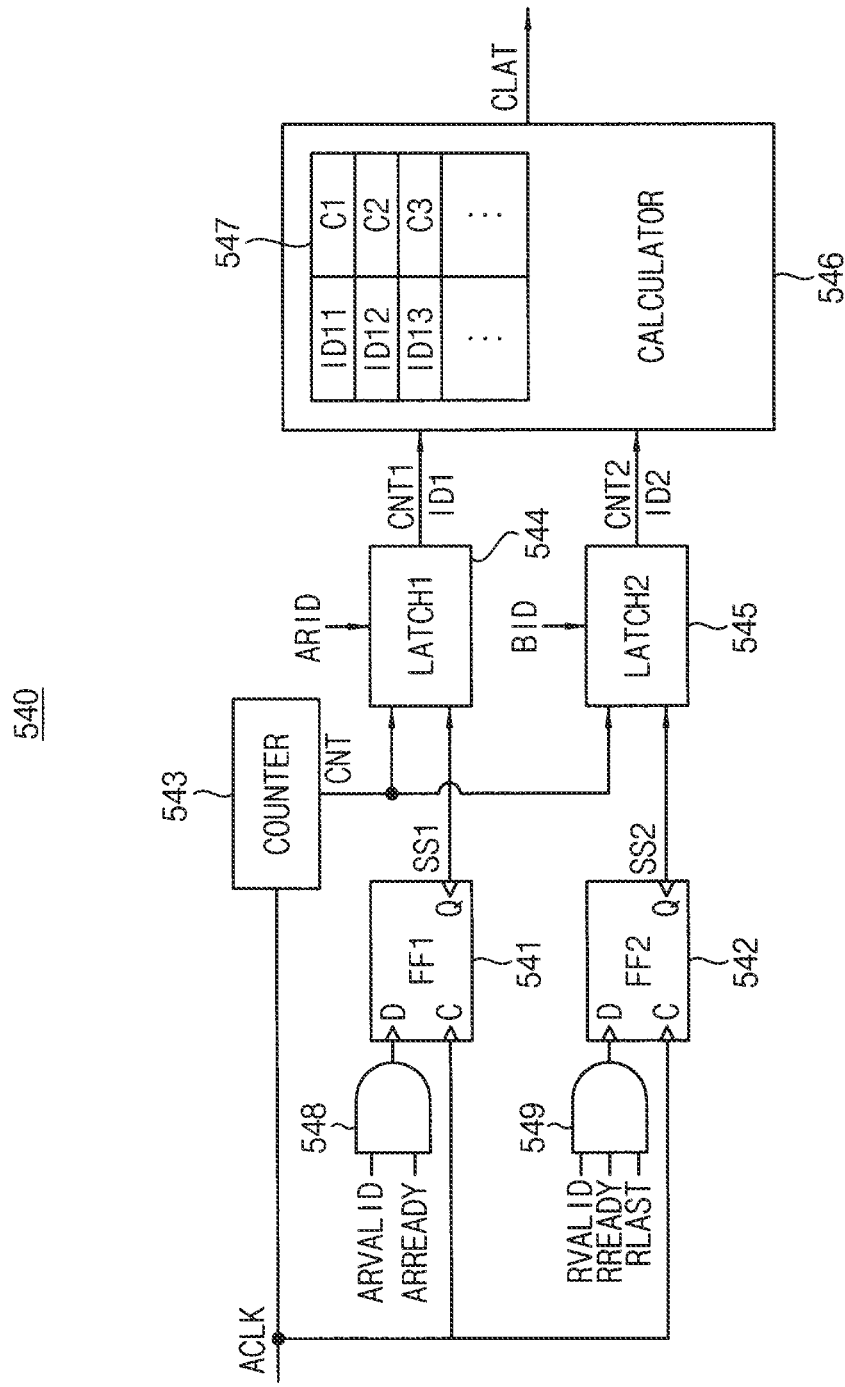
FIG. 18 is a block diagram illustrating an example embodiment of a latency detector included in a multi-core system according to example embodiments.

FIG. 18 is a block diagram illustrating an example embodiment of a latency detector included in a multi-core system according to example embodiments.

Referring to FIG. 18, a latency detector 540 may include a first flip-flop (FF1) 541, a second flip-flop (FF2) 542, a counter 543, a first latch (LATCH1) 544, a second latch (LATCH2) 545, a calculator 546, a first logic gate 548 and a second logic gate 549.

For example, the first logic gate 548 may be implemented as an AND gate that performs an AND operation on a request valid signal ARVALID and a request ready signal ARREADY to output an operation result. The output of the first gate 548 is input to a data terminal D of the first flip-flop 541 and a global clock signal ACLK is input to a clock terminal C of the first flip-flop 541. The first flip-flop 541 samples the output of the first gate 548 in response to a rising edge of the global clock signal ACLK to output a first sampling signal SS1 though an output terminal Q.

For example, the second logic gate 549 may be implemented as an AND gate that performs an AND operation on a service valid signal RVALID, a service ready signal RREADY and a service done signal RLAST to output an operation result. The output of the second gate 549 is input to a data terminal D of the second flip-flop 542 and the global clock signal ACLK is input to a clock terminal C of the second flip-flop 542. The second flip-flop 541 samples the output of the second gate 549 in response to a rising edge of the global clock signal ACLK to output a second sampling signal SS2 though an output terminal Q.

The counter 543 counts a cycle number of the global clock signal ACLK to provide a count signal CNT. The first latch 544 latches the count signal CNT in response to a rising edge of the first sampling signal SS1 to provide a start count signal CNT1. The first latch 544 may receive a first identification signal ARID associated the request signals ARVALID and ARREADY to provide a first identification code ID1. The second latch 545 latches the count signal CNT in response to a rising edge of the second sampling signal SS2 to provide an end count signal CNT2. The second latch 545 may receive a second identification signal BID associated the service signals RVALID, RREADY and RLAST to provide a second identification code ID2.

The calculator 546 generates a current latency CLAT based on the start count signal CNT1 and the end count signal CNT2. When the system 1000 adopts a protocol supporting multiple outstanding transactions between the master devices, the interconnect device and the slave devices, the identification signals ARID and BID may be used to determine whether the request signals ARVALID and ARREADY are associated with the same transaction as the service signals RVALID, RREADY and RLAST.

Whenever the start count signal CNT1 and the first identification code ID1 are input, the calculator 546 may upgrade a mapping table 547 to store values ID11, ID12 and ID13 of the first identification code ID1 and corresponding count values C1, C2 and C3 of the start count signal CNT1. When the end count signal CNT2 and the second identification code ID2 are input, the calculator 546 extracts one of the count values C1, C2 and C3 from the mapping table 547 by comparing the value of the second identification signal ID2 and the previously stored values ID11, ID12 and ID13 of the first identification signal ID1.

The calculator 546 may generate the current latency CLAT by calculating the difference between the extracted value representing the service request timing point and the value representing the issue done timing point.

The current latency CLAT obtained as such may be used to expect the end time point T2 of the stall period tST. In other words, the current latency CLAT may be used to control the timings of the fine-grained DVFS according to example embodiments.

Figure 19:
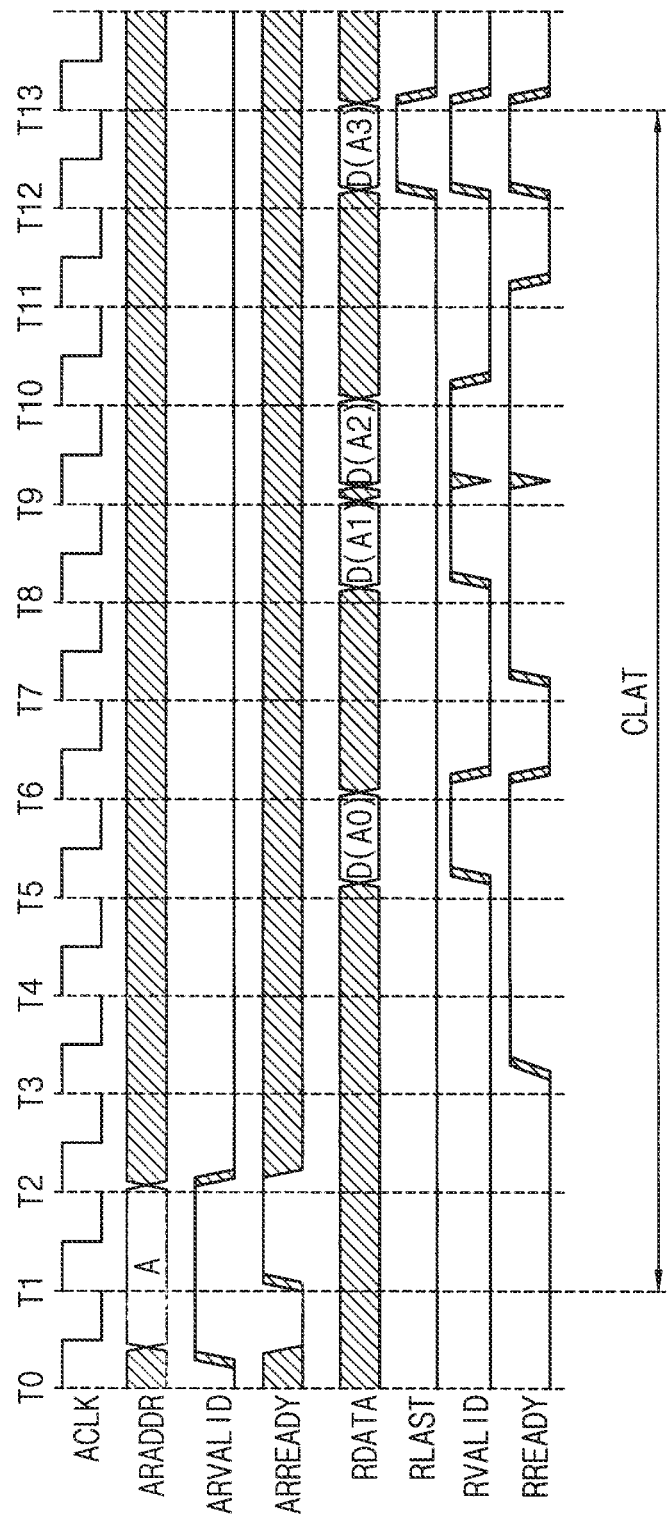
FIG. 19 is a timing diagram illustrating an example transaction performed by a multi-core system according to example embodiments and a current latency detected by the latency detector of FIG. 18.

FIG. 19 is a timing diagram illustrating an example transaction performed by a multi-core system according to example embodiments and a current latency detected by the latency detector of FIG. 18.

FIG. 19 illustrates an example of a read transaction according to an advanced extensible interface (AXI) protocol. The AXI protocol adopts a handshake scheme using valid signals ARVALID and RVALID and ready signals ARREADY and RREADY.

According to the handshake scheme, if a first one of a master interface and a slave interface transfers a signal to a second one of the master interface and the slave interface, the first one activates a valid signal, and then the second one activates a ready signal corresponding to the valid signal when the second one is ready to receive the signal. Sampling of signals is performed in response to rising edges of a global clock signal ACLK at both of the master interface and the slave interface. In other words, a valid signal transfer is fulfilled when both of the valid signal and the ready signal are activated at the same rising edge of the global clock signal ACLK.

As illustrated in FIG. 19, the master device 100 corresponding to the master interface activates a request valid signal ARVALID when the master device transfers a signal and the interconnect device 10 corresponding to the slave interface activates a request ready signal ARREADY when the interconnect device 10 is ready to receive the signal from the master device 100. In the same way, the interconnect device 10 activates a service valid signal RVALID when the interconnect device 10 transfers a signal and the master device 100 activates a service ready signal RREADY when the master device is ready to receive the signal from the interconnect device 10.

The rising edges of the global clock signal ACLK are represented as timing points T0 through T13 in FIG. 19. The master interface 100 corresponding to the master interface transfers a read request signal ARADDR to the interconnect device 10 corresponding to the slave interface by activating the request valid signal ARVALID corresponding to a service request signal. The read request signal ARADDR is transferred successfully at the timing point T2 when both of the request valid signal ARVALID and the request ready signal ARREADY are activated. The master device 100 may determine the timing point T1 as a service request timing point based on the request valid signal ARVALID regardless of the request ready signal, that is, regardless of the success of the valid signal transfer.

As a response to the read request, data D(A0), D(A1), D(A2) and D(A3) of a burst type are transferred from the interconnect device 10 to the master device 100. The data D(A0), D(A1), D(A2) and D(A3) are transferred successfully at timing points T6, T9, T10 and T13, respectively, when both of the service valid signal RVALID and the service ready signal RREADY are activated. The interconnect device 10 activates a service done signal RLAST with transferring the last data D(A3), and the timing point T13 is determined as a service done timing point. [111] As such, the latency detector 540 of FIG. 18 may detect the current latency CLAT based on the request signals ARVALID and ARREADY and the service signals RVALID, RREADY and RLAST between the multi-core system and an external device such as a memory device.

Figure 20:
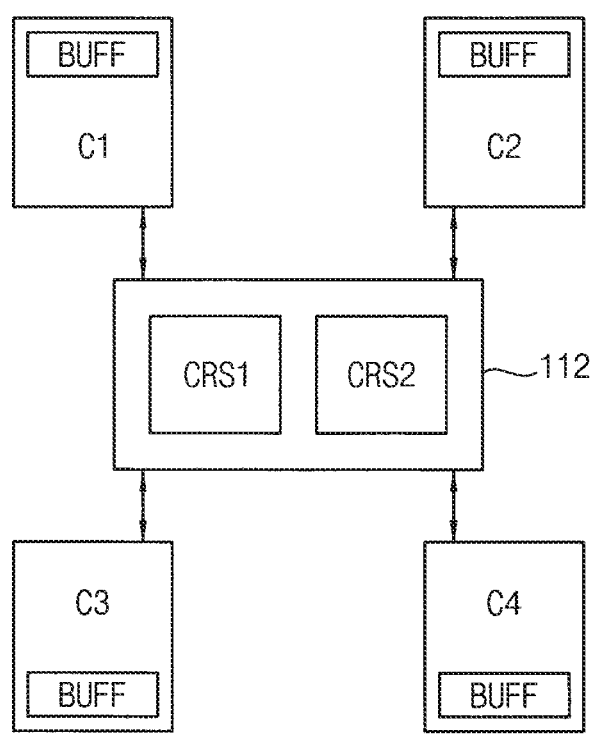
FIG. 20 is a block diagram illustrating an example embodiment of a processor included in a multi-core system according to example embodiments.

FIG. 20 is a block diagram illustrating an example embodiment of a processor included in a multi-core system according to example embodiments.

Referring to FIG. 20, a processor 111 may include, for example, four processor cores C1~C4 and a common circuit 112 that is used and shared by the processor cores C1~C4. The common circuit 112 may include one or more common resources CRS1 and CRS2.

The processor cores C1~C4 may include a buffer BUFF, respectively, to store input data, intermediate data generated during processing, and processing result data.

When one processor core requires to use a common resource while another processor core occupies the common resource, the one processor core must standby until the another processor core quits the occupation of the common resource. As a result, the one processor core may not execute the task requiring the common resource even though other tasks are not executed in the one processor core. The time for which an already-started task has to standby may be included in the above-described stall time.

Figure 21:
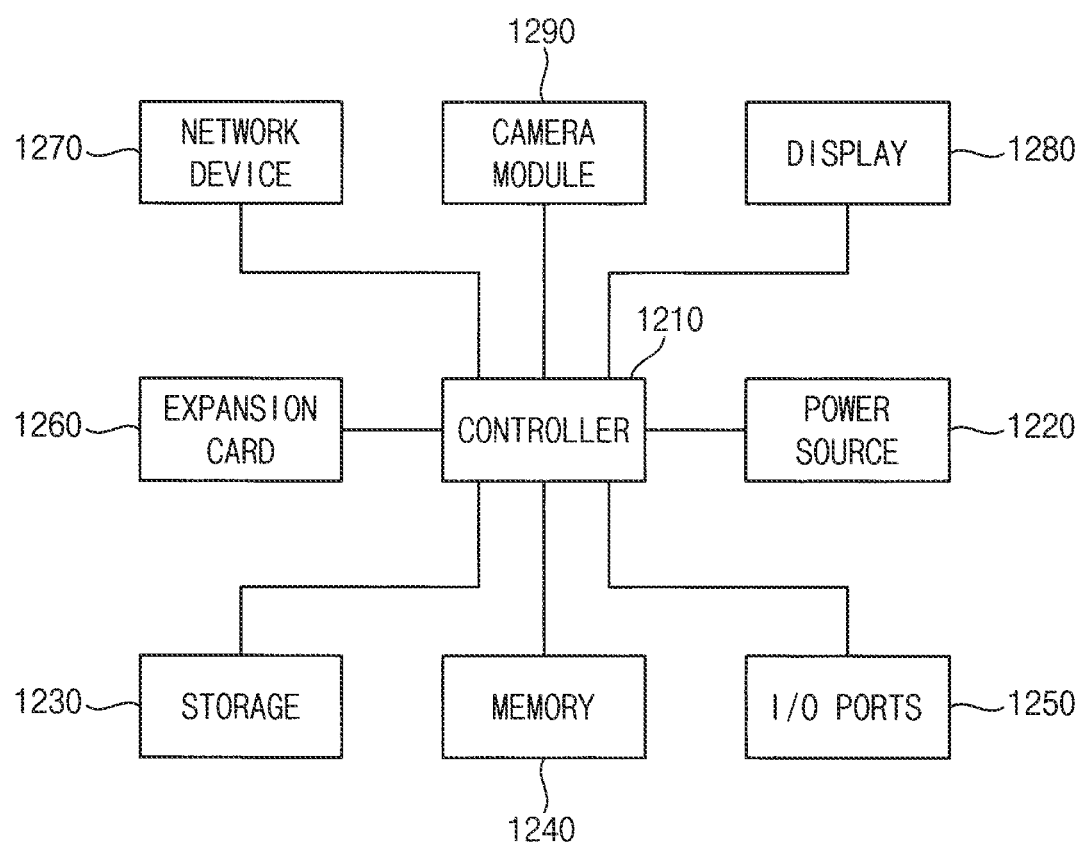
FIG. 21 is a block diagram illustrating an electronic system according to example embodiments.

FIG. 21 is a block diagram illustrating an electronic system according to example embodiments.

Referring to FIG. 21, an electronic system may include a controller 1210, a power source 1220, a storage 1230, a memory 1240, I/O ports 1250, an expansion card 1260, a network device 1270, and a display 1280. According to example embodiments, the electronic system may also include a camera module 1290.

The controller 1210 may control the operation of each of the elements 1220 through 1280. The power source 1220 may supply an operating voltage to at least one of the elements 1210 and 1230 through 1280. The storage 1230 may be implemented as a hard disk drive (HDD) or an SSD. The memory 1240 may be implemented as a volatile or non-volatile memory. The I/O ports 1250 may transmit data to the electronic system or transmit data output from the electronic system to an external device. For example, the I/O ports 1250 may include a port for connection with a pointing device such as a computer mouse, a port for connection with a printer, and a port for connection with a universal serial bus (USB) drive.

The expansion card 1260 may be implemented as a secure digital (SD) card or an MMC. The expansion card 1260 may be a subscriber identity module (SIM) card or a universal SIM (USIM) card.

The network device 1270 enables the electronic system to be connected with a wired or wireless network. The display 1280 displays data output from the storage 1230, the memory 1240, the I/O ports 1250, the expansion card 1260, or the network device 1270.

The camera module 1290 is a module that can convert an optical image into an electrical image. Accordingly, the electrical image output from the camera module 1290 may be stored in the storage 1230, the memory 1240, or the expansion card 1260. In addition, the electrical image output from the camera module 1290 may be displayed through the display 1280. For example, the camera module 1290 may include a camera.

The controller 1210 may be implemented as a multi-core system as described above. The controller 1210 may include a task monitor circuit and a task scheduler to perform task scheduling proper for a fine-grained DVFS according to example embodiments.

The inventive concept may be applied to any electronic devices and systems requiring efficient multi-processing. For example, the inventive concept may be applied to systems such as a memory card, a solid state drive (SSD), an embedded multimedia card (eMMC), a universal flash storage (UFS), a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, etc.

The elements of the multi-core system 1000 described herein such as the System-on-Chip (SoC), described above, including the task monitor circuit 115, task scheduler 135 and the power managing circuit including the PMU 144 and the CMU 146, may be implemented in processing circuitry such as hardware including logic circuits; a hardware/software combination such as a processor executing software; or a combination thereof and memory. For example, the processing circuitry more specifically may include, but is not limited to, a central processing unit (CPU), an arithmetic logic unit (ALU), a digital signal processor, a microcomputer, a field programmable gate array (FPGA), a programmable logic unit, a microprocessor, application-specific integrated circuit (ASIC), etc.

The processing circuitry may be special purpose processing circuitry that improves the functioning of the multi-core system 1000 by assigning the plurality of tasks to the plurality of processor cores based on load unbalancing to temporarily lower power consumption of the plurality of cores while execution of at least one of the plurality of tasks assigned to a reference processor core is suspended. Therefore, the special purpose processing circuitry may increase the effects of fine grained DVFS to reduce the power consumption of the multi-core system 1000.

The foregoing is illustrative of example embodiments and is not to be construed as limiting thereof. Although a few example embodiments have been described, those skilled in the art will readily appreciate that many modifications are possible in the example embodiments without materially departing from the inventive concepts.

What is claimed is:

1. A method of operating a multi-core system including a plurality of processor cores, the method comprising:
    monitoring a task stall time of each task of a plurality of tasks to generate a plurality of task stall information, respectively, the task stall time indicating a length of time that the each task is suspended within a task active time, the task active time indicating a length of time that a corresponding processor core of the plurality of processing core is occupied by the each task;
    performing task scheduling based on the plurality of task stall information, the performing task scheduling including selectively performing load-imbalanced task scheduling based on at least a first power consumption amount of fine-grained dynamic voltage and frequency scaling (DVFS) associated with the load imbalanced task scheduling in which the plurality of tasks are assigned to the plurality of processor cores such that workloads of the plurality of processor cores are imbalanced; and
    performing the fine-grained DVFS based on the task scheduling.

2. The method of claim 1, wherein the plurality of processor cores are included in a single clock domain such that the plurality of processor cores are configured to operate based on a same clock signal.

3. The method of claim 1, wherein the performing the fine-grained DVFS temporarily lowers a power level of the plurality of processor cores while execution of at least one of the plurality of tasks is suspended.

4. The method of claim 1, wherein the performing the task scheduling comprises:
    determining, based on the plurality of task stall information, a ratio of an expectation time of applying the fine-grained DVFS to the task active time with respect to the each task to generate a plurality of fine-grained score values corresponding to the plurality of tasks, respectively.

5. The method of claim 4, wherein the expectation time of applying the fine-grained DVFS corresponds to a time while a power level of the corresponding processor core is lowered without performance degradation of the corresponding processor core.

6. The method of claim 4, wherein the performing the fine-grained DVFS comprises:

determining a reference processor core among the plurality of processor cores such that a sum of the fine-grained score values of ones of the plurality of tasks assigned to the reference processor core is a maximum value among sums of ones of the plurality of tasks assigned to other ones of the plurality of processor cores; and
    performing the fine-grained DVFS with respect to the plurality of processor cores based on a reference core state signal associated with the reference processor core, the reference core state signal indicating when execution of the tasks assigned to the reference processor core is suspended.

7. The method of claim 4, wherein the performing the task scheduling further comprises:
    determining the first power consumption amount of the fine-grained DVFS associated with the load-imbalanced task scheduling by which the plurality of tasks are assigned to the plurality of processor cores based on the plurality of fine-grained score values;
    determining a second power consumption amount associated with a load-balanced task scheduling by which the plurality of tasks are assigned to the plurality of processor cores based on load balancing; and
    selecting one of the load-imbalanced task scheduling and the load-balanced task scheduling based on the first power consumption amount and the second power consumption amount.

8. The method of claim 1, wherein the monitoring the task stall time comprises:
    measuring the task active time with respect to the each of the plurality of tasks; and
    measuring the task stall time with respect to the each of the plurality of tasks.

9. The method of claim 8, wherein the monitoring the task stall time further comprises:
    determining a reference suspension time based on a period of changing a power level by the fine-grained DVFS, and
    generating the task stall time based on a sum of ones of a plurality of suspension times that are greater than the reference suspension time while the each task is suspended.

10. The method of claim 8, wherein the performing the task scheduling comprises:
    determining a ratio of the task stall time to the task active time with respect to the each task to generate a plurality of fine-grained score values corresponding to the plurality of tasks, respectively; and
    assigning the plurality of tasks to the plurality of processor cores based on the plurality of fine-grained scored values.

11. The method of claim 1, wherein the monitoring the task stall time comprises:
    measuring the task active time with respect to the each task;
    measuring the task stall time with respect to the each task; and
    measuring a task stall number indicating a suspension number of the each task.

12. The method of claim 11, wherein the monitoring the task stall time further comprises:
    determining a reference suspension time based on a period of changing a power level by the fine-grained DVFS;

generating the task stall time based on a sum of ones of a plurality of suspension times that are greater than the reference suspension time while the each task is suspended; and generating the task stall number of the each task based on a number of the plurality of suspension times that are greater than the reference suspension time.

13. The method of claim 11, wherein performing the task scheduling comprises:

determining a level changing time with respect to the each task based on the task stall number, the level changing time corresponding to an amount of time to change a power level of the plurality of processor cores;

calculating an expectation time with respect to the each task by subtracting the level changing time from the task stall time;

calculating, for each of the plurality of tasks, a ratio of the expectation time to the task active time to generate a plurality of fine-grained score values corresponding to the plurality of tasks, respectively; and assigning the plurality of tasks to the plurality of processor cores based on the plurality of fine-grained scored values.

14. The method of claim 1, further comprising:

raising a power level of the plurality of processor cores, in response to the performing the fine-grained DVFS causing at least one of core execution times of the plurality of processor cores to exceed a maximum execution time.

15. The method of claim 1, further comprising:

increasing a scheduling period of updating the task scheduling with respect to the plurality of processor cores, in response to the performing the fine-grained DVFS causing at least one of core execution times of the plurality of processor cores to exceed a maximum execution time.

16. The method of claim 1, further comprising:

measuring a latency corresponding to a delay from when the plurality of processor cores issue a request for service from an external device to when the service requested is completed; and controlling a timing of the fine-grained DVFS based on the latency.

17. A multi-core system comprising:

a multi-core processor including a plurality of processor cores; and processing circuitry configured to, monitor a task stall time of each task of a plurality of tasks to generate a plurality of task stall information, the task stall time indicating a length of time that the each task is suspended within a task active time, the task active time indicating a length of time that a corresponding processor core is occupied by the each task, perform task scheduling based on the plurality of task stall information, the performing task scheduling including selectively performing load-imbalanced task scheduling based on at least a first power consumption amount of fine-grained dynamic voltage and frequency scaling (DVFS) associated with the load imbalanced task scheduling in which the plurality of tasks are assigned to the plurality of processor cores such that workloads of the plurality of processor cores are imbalanced, and perform the fine-grained DVFS based on the task scheduling.

18. The multi-core system of claim 17, wherein the processing circuitry is further configured to, determine, based on the plurality of task stall information, a ratio of an expectation time of applying the fine-grained DVFS to the task active time with respect to the each task to generate a plurality of fine-grained score values corresponding to the plurality of tasks, respectively, and assign the plurality of tasks to the plurality of processor cores based on the plurality of fine-grained score values.

19. A method of operating a multi-core system including a plurality of processor cores, the method comprising:

monitoring a task stall time of each task of a plurality of tasks to generate a plurality of task stall information, the task stall time indicating a length of time where the each task is suspended within a task active time, the task active time indicating a length of time where a corresponding processor core is occupied by the each task, the plurality of processor cores being included in a single clock domain operating based on a same clock signal;

determining, based on the plurality of task stall information, a ratio of an expectation time of applying a fine-grained DVFS to the task active time with respect to the each task to generate a plurality of fine-grained score values respectively corresponding to the plurality of tasks, respectively;

assigning the plurality of tasks to the plurality of processor cores based on the plurality of fine-grained score values;

determining a reference processor core among the plurality of processor cores such that a sum of the fine-grained score values of ones of the plurality of tasks assigned to the reference processor core is a maximum value among sums of ones of the plurality of tasks assigned to other ones of the plurality of processor cores; and performing the fine-grained DVFS with respect to the plurality of processor cores based on a reference core state signal associated with the reference processor core to temporarily lower a power level of the plurality of processor cores while execution of at least one of the plurality of tasks assigned to the reference processor core is suspended, the reference core state signal indicating when execution of the plurality of tasks assigned to the reference processor core is suspended.

* * * * *